US011453494B2

(12) United States Patent
Bouffard et al.

(10) Patent No.: US 11,453,494 B2
(45) Date of Patent: Sep. 27, 2022

(54) UNMANNED AERIAL VEHICLE AREA SURVEYING

(71) Applicant: Skydio, Inc, Redwood, CA (US)

(72) Inventors: Patrick Michael Bouffard, Albany, CA (US); Bernard J. Michini, San Francisco, CA (US)

(73) Assignee: Skydio, Inc., Redwood City, CA (US)

( * ) Notice: Subject to any disclaimer, the term of this patent is extended or adjusted under 35 U.S.C. 154(b) by 108 days.

(21) Appl. No.: 15/600,290

(22) Filed: May 19, 2017

(65) Prior Publication Data

US 2017/0334559 A1 Nov. 23, 2017

Related U.S. Application Data

(60) Provisional application No. 62/339,307, filed on May 20, 2016.

(51) Int. Cl.
*B64C 39/02* (2006.01)
*G08G 5/00* (2006.01)
*G05D 1/00* (2006.01)
*G05D 1/02* (2020.01)

(52) U.S. Cl.
CPC ......... *B64C 39/024* (2013.01); *G05D 1/0094* (2013.01); *G05D 1/0202* (2013.01); *G08G 5/006* (2013.01); *G08G 5/0013* (2013.01); *G08G 5/0026* (2013.01); *G08G 5/0034* (2013.01); *G08G 5/0039* (2013.01); *G08G 5/0069* (2013.01); *G08G 5/0082* (2013.01); *G08G 5/0091* (2013.01); *B64C 2201/127* (2013.01); *B64C 2201/141* (2013.01)

(58) Field of Classification Search
None
See application file for complete search history.

(56) References Cited

U.S. PATENT DOCUMENTS

| 2014/0249692 A1* | 9/2014 | Levien | B64C 39/024 701/2 |
| 2014/0316616 A1* | 10/2014 | Kugelmass | G05D 1/101 701/8 |
| 2015/0066248 A1* | 3/2015 | Arbeit | G01C 21/20 701/2 |
| 2016/0327959 A1* | 11/2016 | Brown | G08G 5/0069 |

* cited by examiner

*Primary Examiner* — Abdhesh K Jha
(74) *Attorney, Agent, or Firm* — Young Basile Hanlon & MacFarlane, P.C.

(57) ABSTRACT

Methods, systems and apparatus, including computer programs encoded on computer storage media for an unmanned aerial vehicle aerial survey. One of the methods includes receiving information specifying a location to be inspected by an unmanned aerial vehicle (UAV), the inspection including the UAV capturing images of the location. Information describing a boundary of the location to be inspected is obtained. Inspections to be assigned to the location are determined, with the inspection legs being parallel and separated by a particular width. A flight pattern is determined based on a minimum turning radius of the UAV, with the flight pattern specifying an order each inspection leg is to be navigated along, and a direction of the navigation.

30 Claims, 20 Drawing Sheets

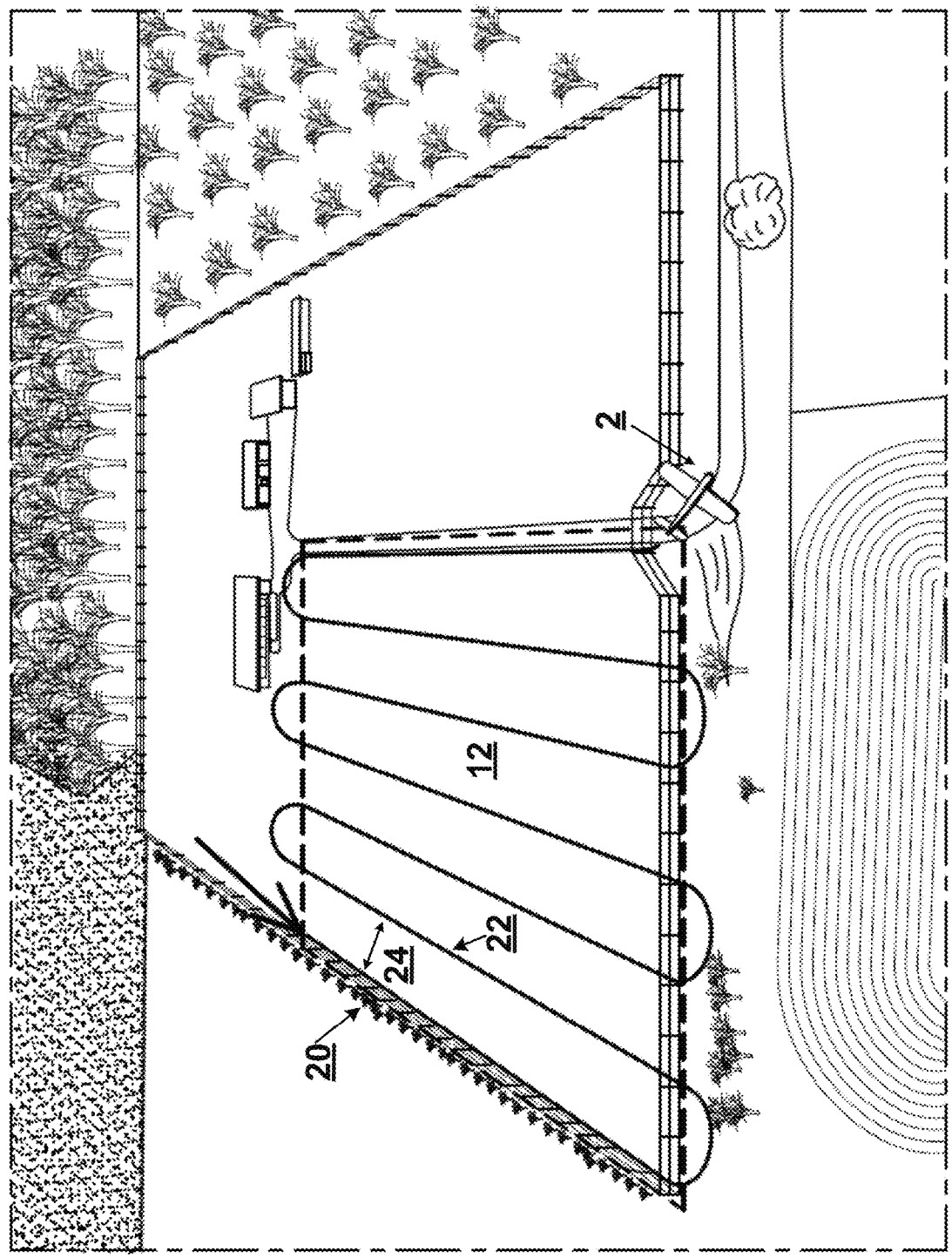

UNMANNED AERIAL VEHICLE AREA SURVEYING

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned aerial vehicles (UAVs) can be navigated, for instance in a consumer setting, by consumers according to manual inputs provided via controllers operated by the consumers. In commercial settings, a UAV can be operated according to an autopilot executing on the UAV that follows a pre-programmed flight plan. For instance, the flight plan can include one or more waypoints specified by Global Navigation Satellite System (GNSS) coordinates (e.g., GPS, GLONASS, BeiDou, Galileo, coordinates), and the autopilot can cause the UAV to navigate to each waypoint.

SUMMARY

Particular embodiments of the subject matter described in this specification can be implemented so as to realize one or more of the following advantages. A flight planning system can, with minimal user input, determine a flight pattern for an unmanned aerial vehicle (UAV) to implement, such that the UAV can traverse an area to be inspected according to constraints associated with the UAV. For instance, the UAV, such as a fixed-wing vehicle, can be constrained according to a minimum turning radius that the UAV can perform (e.g., the UAV can be limited to a maximum bank angle, and/or a maximum velocity). When inspecting an area, such as a large agricultural area, mining area, and so on, the flight planning system can determine an optimal flight pattern for the UAV to follow such that the UAV can obtain sensor information (e.g., capture images) of the area with a minimum amount of flight time or flight distance.

Additionally, the flight planning system can access weather information (e.g., weather prediction information) for an area that includes that the area to be inspected, and can modify a flight plan according to expected wind conditions. Similarly, the flight planning system can generate multiple flight plans, and a UAV performing an inspection, or an operator located proximate to the UAV, can select between generated flight plans according to actual wind conditions.

In general, one innovative aspect of the subject matter described in this specification can be embodied in systems, computer readable media, and methods that include the actions of determining a boundary for an area to be inspected by an unmanned aerial vehicle (UAV); determining a flight pattern for the area, the flight pattern including a plurality of inspection legs being substantially parallel to one another, and adjacent inspection legs being separated, by a particular width, wherein at least a first set of two adjacent inspection legs are to be traversed in the same direction by the UAV, wherein each inspection leg is associated with the UAV performing an aerial inspection of the area along the inspection leg; and autonomously navigating the UAV according to the determined flight pattern, and obtaining sensor data of the area while the UAV navigates along each inspection leg.

In general, one innovative aspect of the subject matter described in this specification can be embodied in systems, computer readable media, and methods that include the actions of receiving information specifying a location to be inspected by an unmanned aerial vehicle (UAV), the inspection comprising the UAV capturing images of the location; obtaining information describing a boundary of the location to be inspected; determining a plurality of inspection legs to be assigned to the location, the inspection legs being parallel and adjacent inspection legs being separated, along a first dimension of the location, by a particular width, wherein each inspection leg connects, along a second dimension of the location, opposite portions of the boundary of the location, and wherein each inspection leg is associated with the UAV performing an inspection of the location along the inspection leg; determining a flight pattern associated with navigating the inspection legs, wherein the flight pattern specifies a navigation order of each inspection leg, and wherein the flight pattern is constrained by a minimum turning radius of the UAV; and generating, based on the determined flight pattern, a flight package to be provided to the UAV.

In general, one innovative aspect of the subject matter described in this specification can be embodied in systems, computer readable media, and methods that include the actions of displaying via a user interface, one or more images depicting a view of a location; determining a launch location for the UAV, the launch location having an associated geospatial location; determining a landing location for the UAV, the landing location having an associated geospatial location; determining a flight path for the UAV comprising multiple legs to be flown by the UAV at a survey attitude, wherein the survey altitude is based on a coverage area of one or more sensors used by the UAV for a survey.

The details of one or more embodiments of the subject matter of this specification are set forth in the accompanying drawings and the description below. Other features, aspects, and advantages of the subject matter will become apparent from the description, the drawings, and from the claims.

BRIEF DESCRIPTION OF THE DRAWINGS

FIG. 1B illustrates the UAV performing an inspection of the area according to a second example flight plan.

DETAILED DESCRIPTION

A flight planning system (e.g., the flight planning system 300 described below), can generate flight plans for an unmanned aerial vehicle (UAV) to implement, which enable the UAV to perform tasks including, for example, inspections of areas (e.g., large areas, such as farms, forests, mining areas, large construction sites, and so on). In this specification, a flight plan includes all information sufficient to enable a UAV, optionally in concert with an operator located proximate to the UAV, to perform tasks, activate one or more sensors (e.g., cameras, infra-red sensors, ultraviolet sensors, distance sensors such as Lidar, Leddar, and so on), navigate to waypoints or along a flight pattern, and so on. As will be described, the UAV can activate sensors (e.g., obtain images) periodically according to distance traveled (e.g., ground distance traveled based on GNSS information), periodically according to time, according to one or more triggers (e.g., an operator can trigger the UAV to capture one or more images), and so on. The obtained images can be provided to an outside system (e.g., a photogrammetry system) that can combine (e.g., stitch together) the images, generate a 3D model, and so on.

Figure 1A:
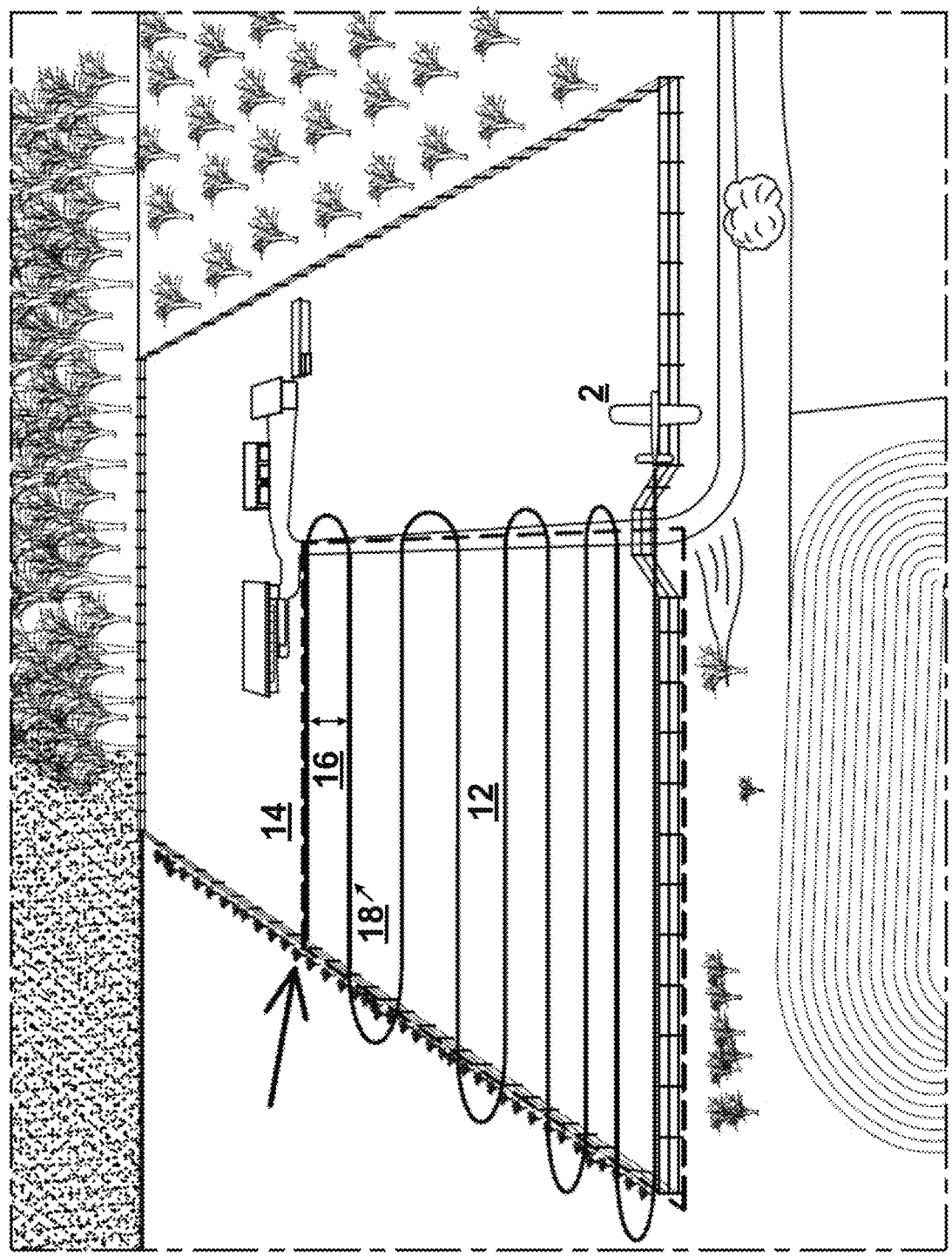
FIG. 1A illustrates an unmanned aerial vehicle (UAV) performing an inspection of an area according to a first example flight plan.

The flight planning system can receive, or otherwise obtain, information describing an area to be inspected, such as an address, GNSS coordinates (e.g., longitude/latitude), and so on, and, optionally along with user input, can determine a flight pattern for the UAV to follow. In this specification a flight pattern is a real-world route the UAV is to follow, and can include waypoints the UAV is to travel to, information indicating locations, times, and or events, associated with the UAV executing turns, changing altitudes, hovering, performing actions (e.g., capturing images), and so on. As an example, a flight pattern can indicate particular waypoints connected by lines, curves, and so on, that are sufficient to enable the UAV to navigate according to the flight pattern (e.g., a flight pattern as illustrated in FIGS. 1A-1B).

To determine the flight plan, the flight planning system can determine an efficient and economical flight pattern (e.g., minimizing flight time, distance traveled, distance traveled that is not associated with the inspection such as by making turns, re-traversing portions of the area to be inspected, and so on), which as will be described, can be based on configuration information of the UAV (e.g., a fixed-wing UAV can be constrained to perform turns with a particular minimum turning radius, which can be a user-preference or based on capabilities of the UAV), information describing the area (e.g., property boundary information), a desired level of detail to be captured in sensor information, and so on. In this specification, a level of detail is described herein as a ground sampling distance, which indicates a minimum number of pixels/distance (e.g., pixels/meter), or pixels/distance$^2$, included in an image of a surface, object, or arbitrary real-world item.

The flight planning system can determine a flight pattern by dividing the area to be inspected into parallel legs, with each leg separated in a same direction, from an adjacent leg, by a same width that is based on a ground sampling distance (e.g., a user selected ground sampling distance). For instance, a high ground sampling distance (e.g., a high level of detail) can cause the UAV to fly at a lower altitude, such that the field of view of a camera utilized by the UAV will include less of the area being imaged, and thus more detail of the area. Therefore, the width between legs can be determined to be closer to allow for the entirety of the inspection area to be imaged. In this specification, a leg refers to a straight (e.g., substantially straight, such as within a threshold angle) section, or path, flown by a UAV within the borders of a photosurvey planning polygon (e.g., a shape describing the area to be inspected), along which the UAV is intended to fly at a particular altitude while the imaging payload (e.g., camera) is commanded, or otherwise instructed, to capture images at regularly spatially separated intervals (e.g. every 5 m, which can be based on a ground distance, GNSS coordinates, and so on). A photo survey will typically be comprised of several such legs parallel to one another. While the legs are ideally substantially parallel with one another, and at a similar distance, optionally there can be deviation.

Since the flight pattern of the UAV can be constrained, for instance by a minimum turning radius the UAV can perform, the flight planning system can determine an order that the UAV is to travel to each leg to ensure that the UAV travels a minimum (e.g., within a threshold of a minimum) total distance while obtaining survey data (e.g., obtaining images). For instance, the UAV can begin the flight plan at a first leg (e.g., a top leg, such as at or near an extremity, border, of the area to be inspected), and after completing the first leg, the UAV can execute a turn according to its minimum turning radius. The flight planning system can determine that the second leg after completing the turn is a particular number (e.g., 3 legs, and so on) below the first leg. Similarly, after the second leg is completed, the flight planning system can determine that the third leg is a particular number (e.g., 2 legs) above the second leg. The flight planning system can then determine that the fourth leg is a particular number (e.g., 3 legs) below the third leg, and so on until each leg has been assigned an order. In this way, the flight planning system can cause the UAV to skip legs when navigating according to the determined order, based on capabilities (e.g., turning radius) of the UAV, optionally combined with weather information (e.g., wind). An example of a flight pattern in accordance with the above is illustrated in FIG. 6G. As will be described below, the flight planning system can ensure that legs are not re-traversed, that is legs are only navigated along once. Optionally, the flight planning system can cause the UAV to navigate along each leg more than once, for instance navigating along each leg in a first direction, and then in a second (e.g., opposite) direction.

Alternatively, the flight planning system can determine (e.g., based on a turning radius of the UAV, and a spacing between each leg) that each subsequent leg, according to the determined order, is the adjacent leg along a same direction, generating a "radiator" or "zig-zag" pattern, which is illustrated in FIGS. 1A-1B, and further described below.

In addition, the flight planning system can provide information to the UAV sufficient to enable the UAV to determine the flight plan (e.g., flight pattern) while in flight. For instance, the UAV can receive, maintain, or optionally determined online, information identifying a minimum turning radius, and the width separation between legs, and can determine an order to assign to each leg during flight. As will be described, the UAV can monitor its direction, a current leg being navigated, and a total number of legs that have been navigated, and can determine a next leg that is to be navigated, along with a direction of the navigation, while in flight. Since the UAV can store the above-described values, and not receive a flight plan specifically identifying an order assigned to each leg, for long flights the amount of storage space required in the UAV can be reduced. Additionally, complexity associated with implementing the flight plan can be reduced, reducing potential errors through easily describing core values (e.g., turning radius, width separation, and so on) which can be utilized by the UAV.

Optionally, the flight planning system can obtain terrain information and weather information (e.g., weather prediction information obtained from an outside system), and can utilize the obtained information in determining a flight plan. As an example of utilizing terrain information, the flight planning system can determine a launch/landing location, and a flight pattern between the locations as described above, such that the UAV will not be within a threshold distance of terrain (e.g., the UAV will not be close to a hill) during the flight plan. For instance, a launch location can cause the UAV to take-off, and ascend to a particular altitude over a distance (e.g., a distance based, in part, on configuration information of the UAV such as power characteristics, wing characteristics, and so on). The flight planning system can ensure that terrain, or other obstacles, will not be within a threshold distance of the UAV during ascent.

As an example, the flight planning system can determine an expected increase in altitude per distance (e.g., a rate of ascent) as the UAV navigates from the launch location, and can determine that as the UAV navigates according to the flight pattern (e.g., ascends), an obstacle (e.g., a building or structure) will be within a threshold distance (e.g., threshold distance below the UAV) while the UAV ascends. In this example, the flight planning system can determine to move the launch location further away from the obstacle, such that the UAV has a greater ground distance to ascend, or the launch location can be moved laterally away from the obstacle. Similarly, as an example of utilizing weather information, the flight planning system can determine that wind is expected to affect the area to be inspected in a particular direction (e.g., west, east, south, north), and can determine a launch/landing location based on the wind direction and wind speed. For instance, the flight planning system can determine that, given the wind direction, a flight pattern from the launch location to the first leg of the area to be inspected is to be in the direction of the wind. In this way, the flight planning system can ensure that the UAV is not launching with a tail-wind when initially launching and climbing to a particular altitude (e.g., an altitude above which the UAV can safely travel and avoid obstacles such as power lines, trees, buildings, cell towers, machinery, and so on). The flight planning system can optionally determine multiple launch/landing locations, with each location being associated with particular wind characteristics. For instance, as will be described in, at least, FIG. 2C, each launch location can enable a UAV to ascend (e.g., at a particular rate given the impact of wind velocity and wind direction on the UAV) a sufficient vertical distance at a particular ground distance to be able to clear (e.g., be a threshold distance above) obstacles (e.g., as described above), and also to be able to navigate to a flight pattern to inspect an area. An operator located proximate to the area to be inspected can obtain actual wind characteristics, and the relevant determined flight plan can be utilized.

As will be described, as the UAV navigates according to the determined flight plan, the UAV activates sensors (e.g., captures images), which as an example, can be activated periodically in distance (e.g., ground distance). In this way, the UAV can obtain regularly spaced images of the area to be inspected. Since wind (e.g., wind moving greater than a threshold speed) can affect the UAV's ability to travel in a substantially straight line, to ensure that the UAV follows the flight plan, the UAV (e.g., a fixed-wing aircraft) can bank, or crab, in a direction of the wind to counteract effects of the wind. For particular UAVs that do not have gimbals operable to independently maneuver a camera, when the UAV banks against the wind the camera will no longer be pointing directly down to the surface being imaged (e.g., the ground). Rather, the camera will be pointed slightly askance, which can affect a field of view of the camera, and thus can affect processing of the images to obtain a combined (e.g., stitched together) image (e.g., using a photogrammetry system or photogrammetry software). The UAV computer system can record the orientation of the UAV, and may need to adjust the periodicity (e.g., as described above) of the images obtained to account for the change in the field of view of the camera.

To address the effect of a cross-wind, the UAV may bank against the wind to maintain the flight path track over a leg. In the case of a fixed-wing UAV with a non-gimbled camera, banking the UAV may cause the camera's field-of-view to be angled with respect to the flight path, and not capture images as intended. The UAV may determine that an image should be captured and then temporarily level the UAV, and activate a sensor (e.g., capture an image). Afterwards, the UAV can resume banking and navigate back to the flight pattern (e.g., if the wind blew it off course) until a subsequent activation of the sensor. Similarly, the UAV can 'crab' (e.g., point a nose of the UAV partially into a direction of the wind), such that the UAV's overall trajectory is along the flight pattern. Since this turning will also affect a field of view of the camera, the UAV can temporarily point along the flight pattern, optionally modify functionality of a stability controller (e.g., increase a derivative component) to increase responsiveness to wind, and activate the sensor. Furthermore, after activating the sensor, and within a threshold distance prior to a next activation and a threshold distance subsequent to the next activation, the UAV can determine an optimal time to active the sensor. For instance, the UAV can determine (e.g., measure) a temporary lull in the wind, and activate the sensor. As the UAV navigates along the flight pattern, the UAV can determine wind characteristics of the wind affecting the UAV, and to determine the optimal time to activate the sensor, the UAV can determine that a present measure of the wind characteristics (e.g., wind speed) is within a threshold tolerance of previously measured "lulls" in the wind. In this way, the UAV can accurately determine when the wind is at its lowest.

The periodicity of the images taken may be variable and adjusted according to the bank or crab angle of the UAV. For example, based on the desired ground sampling distance, the altitude and speed flown, the sensor triggering can be set at a particular rate or at particular locations along the flight path of a leg. However, if during flight, the UAV encounters a cross-wind that causes the UAV to bank or crab to maintain the path along the leg, the triggering of the sensor may be increased to ensure survey coverage.

Various types of UAVs may be used to implement the inventions described herein (for example, a fixed wing airplane, helicopter, a multi-rotor vehicle (e.g., a quadcopter in single propeller and coaxial configurations), a vertical take-off and landing vehicle, lighter than air aircraft). A multi-rotor vehicle in a coaxial configuration may use the same propeller pitch and diameter propellers, use different pitch and diameter propellers, or variable pitch propellers. In this specification, UAVs include drones, unoperated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload (e.g., any hardware, software, module, and so on, that is not critical to the flight operation of the UAV), can include any device that captures real-world information, including cameras, radiation measuring instruments, distance detectors such as Lidar, and so on.

FIG. 1A illustrates a UAV 2 performing an inspection of an area 12 according to a first example flight plan (e.g., generated by a flight planning system 300). The UAV 2 is inspecting an area 12, which in the example, is an agricultural area. The UAV 2 can inspect the area 12 to, for instance, determine health of crops growing in the area 12, determine portions of the area 12 that do not have growing crops, and so on. As the UAV 2 navigates around the area 12, the UAV 2 captures sensor data, such as images, of the area 12 (e.g., for an outside photogrammetry system to combine, for instance in combination with location information of the UAV 2). Optionally, as the UAV 2 captures images, the UAV 2 can provide the captured images or sensor data to a user device for review by an operator located proximate to the area 2, (e.g., a ground control system 330 described below) in wireless communication with the UAV 2, to combine the images as they are received.

The UAV 2 is navigating according to the first example flight plan, which specifies a particular flight pattern the UAV 2 is to follow. As illustrated in FIG. 1A, the flight pattern includes parallel legs that cause the UAV to navigate from a particular side of the area 12 to the opposite side of the area 12. For instance, a first leg 14 (e.g., an initial leg flown by the UAV 2) is from a left side of the area 12 to a right side of the area 12. After the UAV 2 reaches the right side of the area 12, the UAV 2 performs a turn towards the bottom of FIG. 1A, and navigates along a second leg 18 from the right side of the area 12 to the left side of the area 12. The first leg 14 and the second 18 are separated by a particular width 16. Additionally, as described above, the first leg 14 connects to the second 18 via a curved segment that causes the UAV 2 to turn from navigating along leg 14 to navigating along leg 18.

As will be described, the width 16 can be determined (e.g., by the flight planning system 300) from a ground sampling distance that a user (e.g., a user of the flight planning system 300) indicates as being acceptable. As described above, a ground sampling distance specifies a threshold number of pixels per distance to be included in images captured by the UAV 2, and is therefore associated with a level of detail to be included in the images. To ensure that the UAV 2 captures images with at least the ground sampling distance, the UAV 2 can be required to travel lower than a particular altitude, which can be based on configuration information of the UAV 2. For example, a configuration of the UAV 2 can include the UAV 2 utilizing a particular camera (e.g., sensor size, sensor resolution, focal length(s) of a lens, aperture(s) of the lens, and so on), which can affect the particular altitude. For example, a camera with a longer focal length and/or with greater sensor resolution, will be able to obtain images with at least the ground sampling distance at a greater altitude than a camera with a lower focal length and/or with a lesser sensor resolution.

To ensure that the entirety of the area 12 is included in images, the width 16 between the legs can be set (e.g., by the flight planning system 300) such that images captured when navigating adjacent legs covers the entirety of the area between each adjacent leg. Optionally, the width 16 can be modified such that images captured when navigating adjacent legs includes overlap. For instance, when navigating the first leg 14 the UAV 2 can capture an image at a particular distance from the left of the area 12, and when navigating the second leg 18, the UAV 2 can capture an image at the particular distance from the left of the area. These two captured images can include overlap of a same portion of the area 12 that is between the first leg 14 and the second leg 18. This overlap can be utilized by an outside system, such as a photogrammetry system, to combine (e.g., stitch together) captured images (e.g., the system can recognize shared features included in the overlap, helping the system to combine the images). Furthermore, and as will be described, the overlap can be modified based on wind characteristics affecting the UAV 2. For instance, the overlap can be increased, and thus the width 16 decreased, if wind is causing the UAV 2 to bank against the wind. As described above, the banking against the wind can cause the camera to be angled such that less images of the area 12 along a particular direction is included in captured images.

The first example flight plan includes parallel legs, adjacent to each other according to the width 16, which are positioned from a top of the area 12 to a bottom of the area 12. The first example flight plan can be determined (e.g., by the flight planning system 300) according to one or more constraints, such as a geofence (e.g., a virtual perimeter or volume that limits allowable locations of the UAV 2, which can depend on time, for instance the geofence can be active for at particular time(s)), wind directionality, and so on. Alternatively, a second example flight plan (e.g., illustrated in FIG. 1B, and described below), can include an overall shorter distance traveled, and can be preferable in some implementations. However, for areas 12 that are big (e.g., long, greater than a threshold distance) in a particular direction (e.g., a rectangle that is of a length substantially greater than its width), the first example flight plan can, in some implementations, be preferable. That is, the first example flight plan can include legs along the shorter direction that are adjacent along the longer direction. As the UAV 2 navigates according to the first example flight plan, after completing a threshold number of legs (e.g., 5 legs, 10 legs, and so on), the UAV 2 can continue the flight plan upon receiving information from an operator that the images captured in the threshold number of legs are acceptable. That is, the operator can utilize a user device (e.g., the ground control system 330 described below), to determine that each captured image exceeds one or more quality thresholds (e.g., the images are not blurry due to a shutter speed being too low, not overexposed, out of focus, and so on), and that a combined (e.g., stitched together) image is acceptable. The operator can then provide information to the UAV 2 indicating that the UAV 2 is to continue to successive legs, and the UAV 2 can continue with the flight plan (e.g., the UAV 2 can, in some implementations, otherwise circle until receiving the information). Alternatively, the operator can indicate that the UAV 2 is to navigate back to one or more legs to re-capture images. Similarly, instead of circling until receiving information, the UAV 2 can immediately continue with successive legs, and return to a prior leg to re-capture images upon receipt of information specifying the return. Additionally, by separating portions of the flight plan into a threshold number of legs, areas of the overall area to be inspected can be processed (e.g., images can be stitched together, 3D models can be generated), and an operator can quickly access the processed areas in a faster period of time.

FIG. 1B illustrates the UAV 2 performing an inspection of the area 12 according to a second example flight plan (e.g., generated by a flight planning system 300). As described above, the second example flight includes legs (e.g., legs 20, 22) along a direction orthogonal to the legs (e.g., legs 14, 18) described in FIG. 1A, which are separated by a width 24 (e.g., the width can be substantially the same width 16 as in FIG. 1A). Since the second example flight plan includes less turns than the first example flight plan, in some implementations the second example flight plan can be preferable to the first example flight plan. However, as will be described, the second example flight plan can be infeasible when wind characteristics, a geofence (e.g., a geofence based on a property boundary of the area 12, which may not allow for the UAV 2 to navigate according to the first example flight plan as the turns may be outside of the property boundary) that limits locations of the UAV 2, and so on, are taken into account. Similarly, the first example flight plan can be infeasible for similar reasons, the description that follows can be attributable to the flight plan described in FIG. 1A also.

As an example of wind speed making a flight plan infeasible, when the UAV 2 is navigating along a leg capturing images, a camera being utilized by the UAV 2 can be associated with a minimum frame rate (e.g., rate at which images are captured). Thus, if the UAV 2 exceeds a particular speed, the UAV 2 will be unable to capture images fast enough to obtain images of the entirety of the area 12 at the ground sampling distance (e.g., acceptable number of pixels/distance as described). That is, a location at which the UAV 2 is to capture an image will be passed before the camera is able to capture a new image, such that the image will be captured at a location further along the leg. If wind is affecting the UAV 2, for instance by being in a same direction as alternate legs, the wind can cause the UAV 2 to exceed a speed at which the UAV 2 is able to periodically capture sufficient images of the area 12. In such a situation, the flight plan can be modified to utilize the first example flight plan, such that the UAV 2 is always traveling perpendicular to the direction of the wind when navigating along each leg (e.g., a tail wind will not propelling the UAV 2 forward at too great of velocity).

A user can utilize one or more user interfaces, generated by a system (e.g., the flight planning system 300), to determine a flight plan to be provided to a UAV. FIGS. 2A-2F illustrate example user interfaces that can be utilized (e.g., by a user) to specify information associated with a flight plan. The user interfaces are examples of interactive user interfaces, generated by a system (e.g., the flight planning system 300, or a presentation system in communication with the flight planning system 300) that can receive user interactions, access one or more databases, and update the user interfaces in response to received user interactions. The user interfaces can be a document (e.g., an interactive document such as a web page), presented on a user device (e.g., a computer, a laptop, a tablet, a smart phone, other mobile device, etc.) for presentation to a user.

Figure 2A:
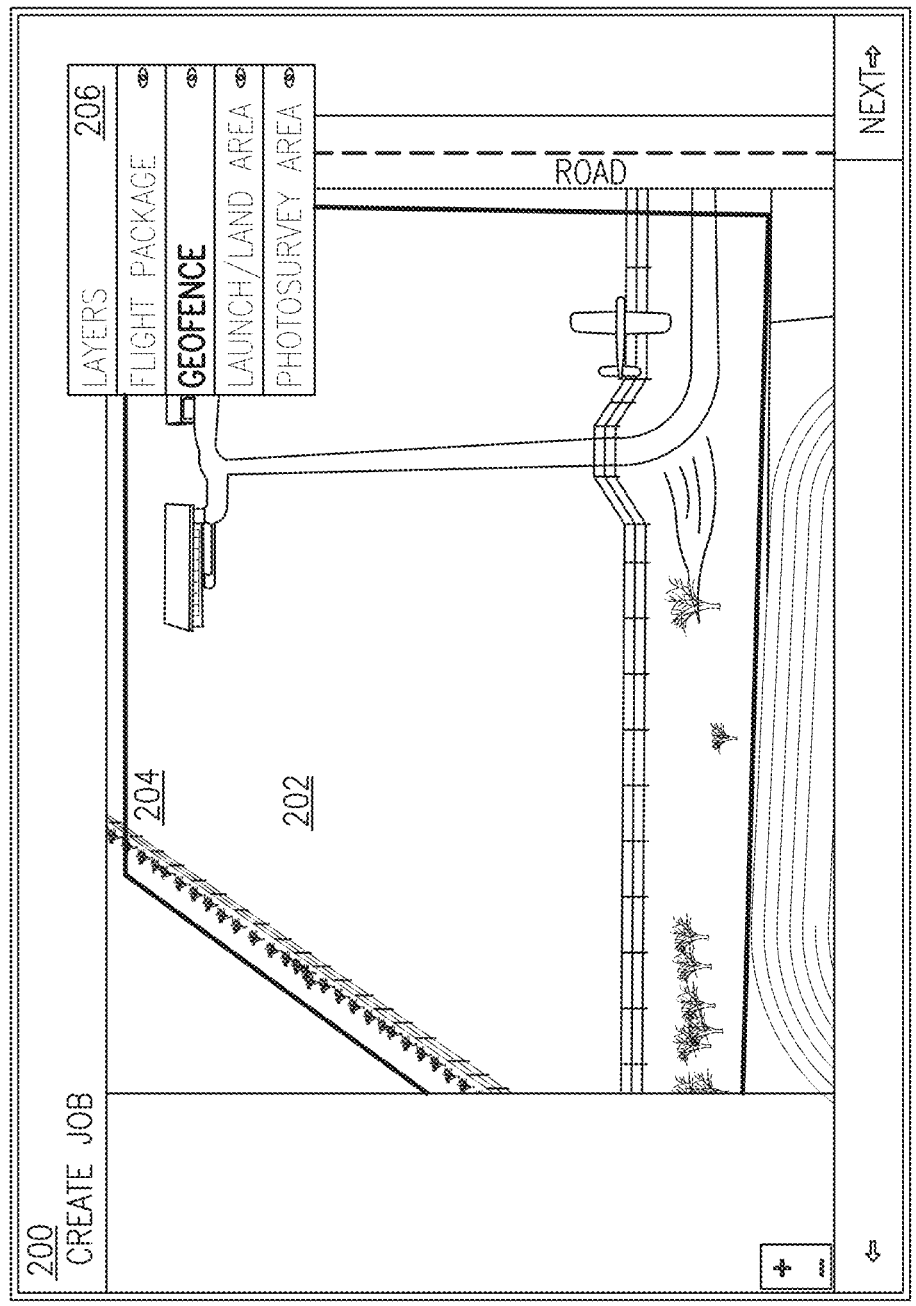
FIG. 2A illustrates an example user interface for determining a geofence boundary.

FIG. 2A illustrates an example user interface 200 for determining a geofence boundary 204. The user interface 200 includes one or more images 202 (e.g., satellite images as depicted in FIG. 2A) of a location entered by the user of the user interface 200. The images 202 included in the user interface 200 can be interactive, and the user can zoom in and out of the image 202 to obtain a greater or smaller real-world area. For instance, the user can interact with a zoom control, or the user can utilize a touch screen to zoom in and out (e.g., the user can pinch to zoom). User interface 200 further includes a selectable option to include particular layers 206 in the user interface 200. For instance, a "geofence" layer has been selected, such that a geofence boundary 204 is included over the images 202. Additional layers are described below, and include a launch/land area, and a photosurvey area that specifies a flight pattern (e.g., as illustrated in FIGS. 1A-1B described above).

As illustrated in FIG. 2, the images 202 includes a highlighted area that defines a geofence boundary 204 to be enforced by a UAV when implementing a flight plan. As described above, a geofence is a two-dimensional or three-dimensional location-based boundary, which limits allowable locations of a UAV. Different types of geofences may be used by the UAV during flight operations. A geofence boundary can be represented on the displayed images 202 map as polygonal shapes, for example a circle, rectangle, sphere, cylinder, or other shape. A geofence may also be time-based (four-dimensional) where the geofence exists for a particular duration, for example, a number of hours or days, or for a specific time period, for example, from 2:00 p.m. to 4 p.m. occurring on certain days, or other periods of time. A three-dimensional geofence may exist in a particular space above ground. A geofence may be represented by latitudinal and longitudinal connected points, or other coordinate systems. A geofence may be created such that the geofence has dynamic aspects to it where the geofence may increase or decrease in size based on various conditions. For UAV flight operations, geofence structures can be received by a UAV (e.g., included in a flight plan) and stored in non-volatile memory.

For both autonomous UAV flight operations, and manually controlled flight operations, the UAV would be limited to flight within a flight boundary geofence 204. If, for example, an operator of the UAV (e.g., an operator located proximate to the UAV) in a manually controlled mode attempts to maneuver the UAV outside of the flight boundary geofence 204, the UAV may detect a contingency condition (that is, the UAV is about to fly outside of the geofence), and then automatically direct the UAV to return to a specified predetermined landing location. Furthermore, if the UAV is capable of hovering, such as a multi-rotor UAV, the UAV may be inhibited from moving across a flight boundary geofence, or perimeter, of the geofence, and the UAV could be set to hover and not continue past the perimeter of the geofence.

A user can specify a geofence 204 for a UAV to enforce. For instance, the user can select portions of the images 202, such that the selected portions define a polygon associated with the geofence. The user can further select a portion of the polygon, and drag it, or move it, to expand or contract the polygon according to the selections. Additionally, the user interface 200 can enable the user to select a particular corner of the images 202, and drag the geofence shape into existence by moving a finger or stylus on a touch sensitive screen of the user device.

Optionally, the flight planning system 300 can obtain property information associated with an input location, such as property boundaries, and automatically include a highlighted portion of the images 802 as being a possible flight boundary geofence. The system can determine that the entered location information describes a particular property (e.g., an open clearing that borders the road), and can highlight the particular property. Optionally, the system can include a buffer from the property boundaries of the location to ensure that even with a strong gust of wind, the UAV will remain within the property boundaries. The property information used to create the flight boundary geofence can be of various data types, for example, parcel polygons, vector, rasterized, shape files, or other data types. For the particular property, the flight planning system may create the flight boundary geofence based on the property shape data. The various data types can have geolocation and/or coordinate information, such as latitudinal/longitudinal points for use in orienting and creating the flight boundary geofence. The geofence envelope may be identical in shape to the property boundary. Optionally, the boundary of the geofence may be reduced in size, which can create a buffer zone. For example, the flight boundary geofence may be reduced in size by a set distance, for example 5 meters, towards a centroid of the property. The buffer zone may help avoid an unintentional flyover of an adjacent property boundary. Optionally, the flight planning system may display an area with parcel polygonal data. An interface of the flight planning system may then receive a selection of one or more parcels. The flight planning system then can use the selections to create one or more jobs (e.g., inspections), and multiple geofence envelopes. For the multiple parcels, the operator would go to each parcel property, and conduct multiple jobs.

The geofence boundary 204 can further be associated with a flight pattern the UAV is to utilize to capture images of the included location 202. For instance, as described above with respect to FIGS. 1A-1B, the UAV can navigate along adjacent legs separated by a width, and capture images of the location. Determining a flight pattern is described below, with respect to FIG. 2D. The geofence boundary 204 can be generated to specify a buffer zone about the flight pattern, for instance the geofence boundary 204 can encompass the flight pattern and optionally include a threshold distance from the flight pattern.

Figure 2B:
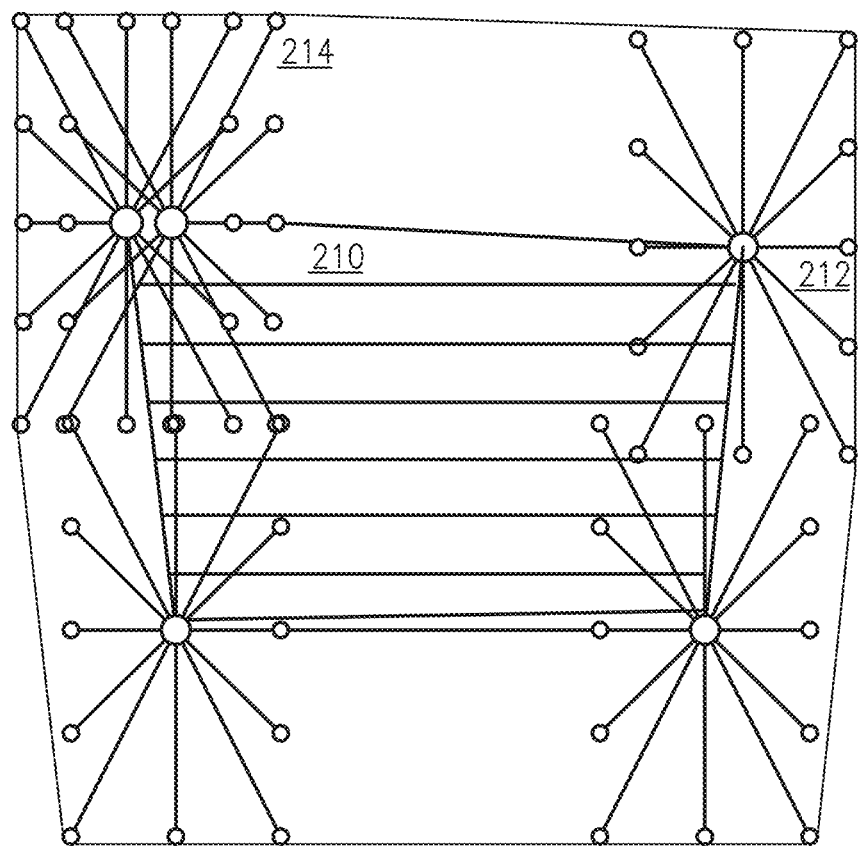
FIG. 2B illustrates an example of a geofence boundary associated with a flight pattern.

An example of a geofence boundary associated with a flight pattern is illustrated in FIG. 2B. The illustration includes legs 210 that a UAV is to navigate along, separated by a same width (e.g., as described above). The geofence boundary is a first distance 214 above and below an initial leg and final leg, and a second distance 212 to the left and right of the legs. The first distance 214 and the second distance 212 can be associated with a minimum turning radius of a UAV that is to be utilized. That is, when the UAV completes navigating along a leg, it executes a turn, and navigates to a different leg. The flight planning system can obtain configuration information of a UAV to be utilized, and can determine a minimum turning radius of the UAV, such as a user set value based on the UAV, or a turning radius of the UAV such that the UAV can be in control during a turn when wind, speed, and other factors, are taken into account. The second distance 212 can then be set at, at least, the minimum turning radius, such that when the UAV executes a turn it is contained within the geofence boundary. Similarly, the first distance 214 can be set at, at least, twice the minimum turning radius. As will be described below, with respect to FIGS. 2C-2D, for a UAV to navigate to an initial leg (e.g., from a take-off location), the UAV may have to execute a loop near the initial leg to orient itself properly. This loop can therefore require that the UAV move in a circle, or twice the minimum turning radius.

Figure 2C:
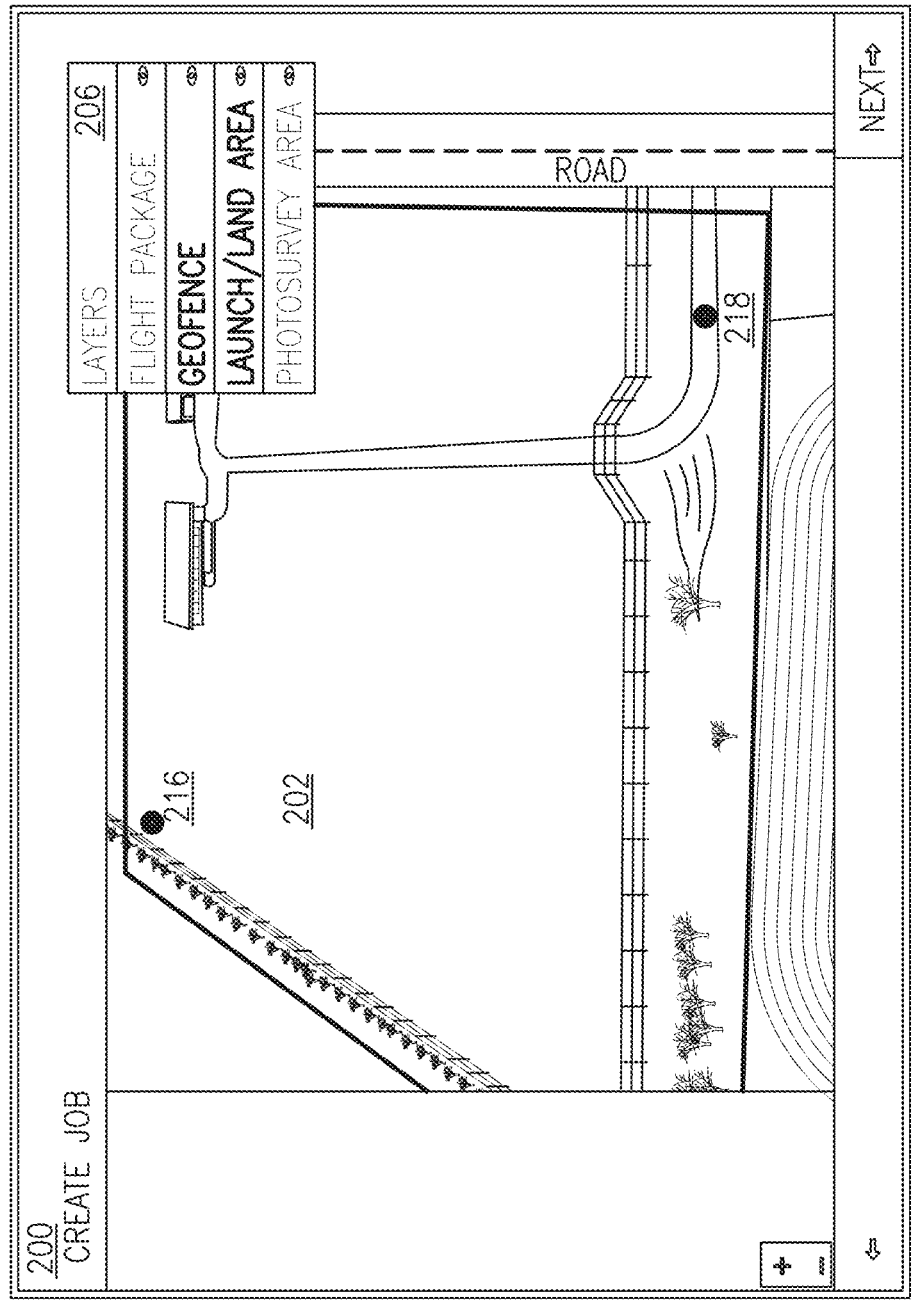
FIG. 2C illustrates an example user interface for determining a launch/landing location.

FIG. 2C illustrates an example user interface 200 for determining a launch/landing location. As described above, the user interface 200 includes selectable options associated with layers 206. In the example of FIG. 2C, a layer associated with a launch/landing location has been selected, such that the user interface 200 has been updated to include a launch (e.g., safe take-off) location 216 and a landing (e.g., safe landing) location 218.

To determine a launch location, as described above the flight planning system 300 can access terrain information, weather information, and optionally images, or 3D models, generated from prior executed flight plans. For instance, the flight planning system 300 can store, or otherwise maintain, information determined from prior flight plans associated with inspecting the location 202. The flight planning system 300 can determine a launch location using the images or 3D models to determine obstacles that are located near the inspection location 202.

Figure 2D:
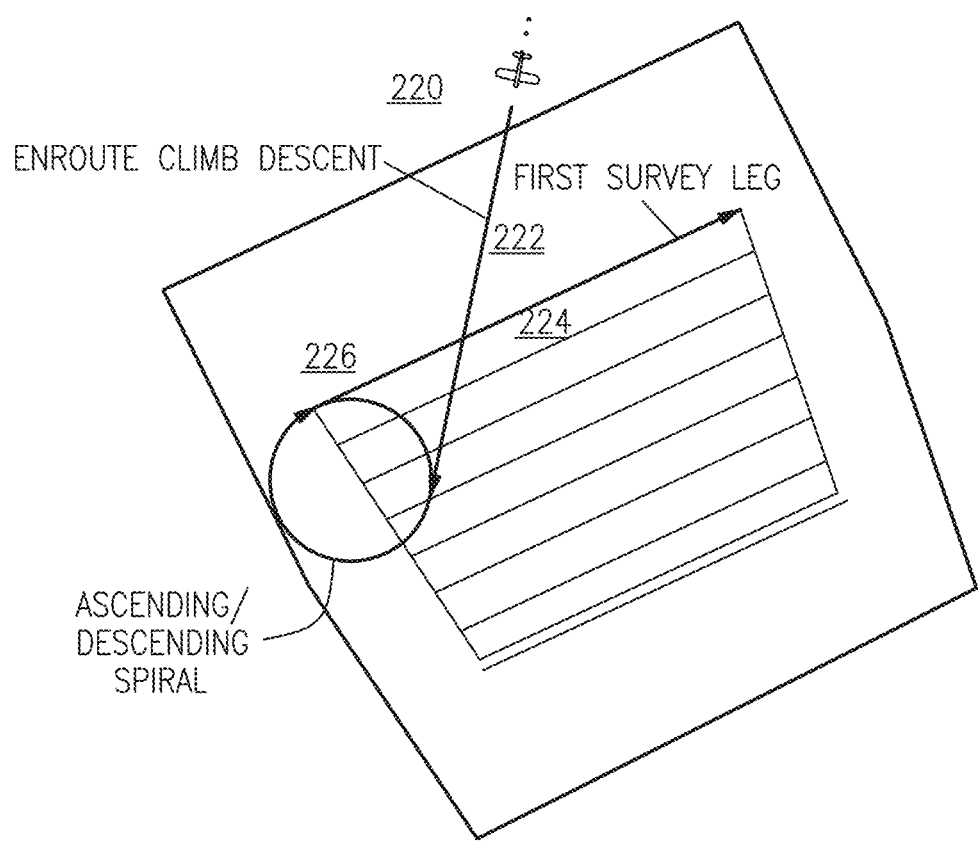
FIG. 2D illustrates navigating from a launch location to an initial leg.

Furthermore, the launch location 216 can be located such that the UAV is able to navigate to an initial leg of a flight pattern. As illustrated in FIG. 2D, a UAV 220 is navigating from a launch location along a flight pattern 222 to reach an initial leg 224. The flight pattern includes the UAV 220 executing a loop 226 to orient itself along a direction of the initial leg 224. The flight planning system 300 can determine the launch location 216 to be located such that a UAV is able to orient itself along the initial 224 without violating a geofence boundary (e.g., as described above in FIG. 2A).

In addition to the flight planning system 300 determining launch and landing locations, a user of the user interface 200 can select the launch location 216 and landing location 218. Optionally, the flight planning system 300 can analyze the selected launch location 216 and landing location 218 to determine whether they are suitable to be utilized. For instance, the flight planning system 300 can identify whether obstacles, such as water (e.g., a puddle), are located at, or within a threshold distance of, the locations 216, 218. Furthermore, the flight planning system 300 can determine whether a UAV will be able to navigate to an initial leg, and or whether the UAV will be able to safely ascend to the particular altitude from the launch location 216 without encountering obstacles. If the flight planning system 300 determines that the selected locations will cause an issue with the flight plan (e.g., likely cause an issue), the flight planning system 300 can present a notification indicating that the launch location 216 or the landing location 218 is not suitable.

Optionally, the flight planning system 300 can obtain information associated with prior flight plans to inspect the location 202. The flight planning system 300 can present prior launch and landing locations (e.g., locations associated with successful flight plans), and optionally other information associated with the prior flight plans. For example, operators or other personnel that were involved in the prior flight plans might have recorded text describing the flight plans and any potential issues with the flight plans or location 202. For instance, an operator may have specified that a launch location had to be moved once he/she got to the location 202 due to a powerline, or guy-wire, or other obstruction, which is not visible in obtained images of the location 202. In this way, the user interface 200 can present one or more of, a location that was initially assigned for the prior flight plan, the operator's text indicating that the location isn't suitable, and a final launch location selected by the operator.

Figure 2E:
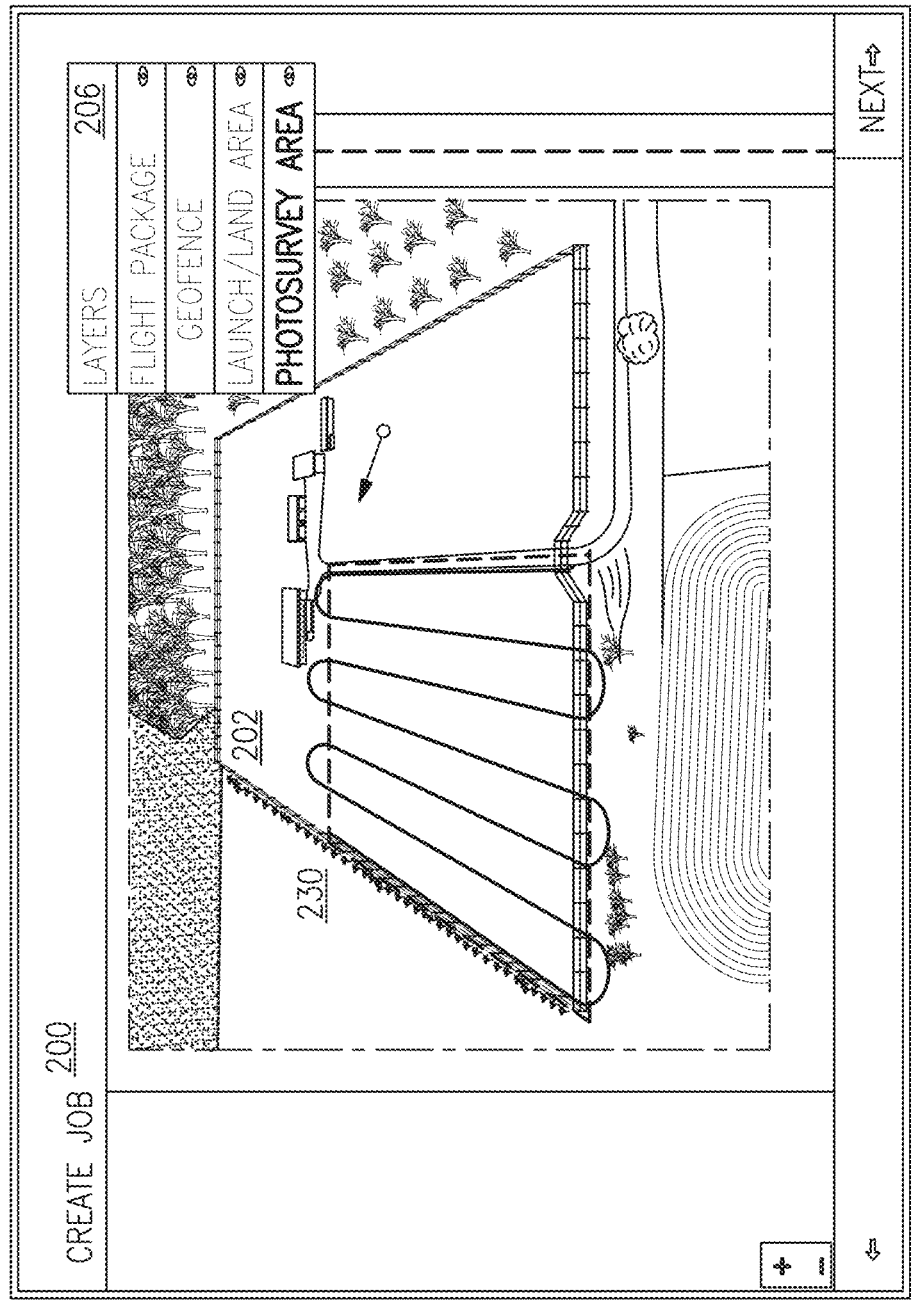
FIG. 2E illustrates an example user interface for determining a flight pattern to perform an inspection of a location.

FIG. 2E illustrates an example user interface 200 for determining a flight pattern to perform an inspection of a location 202. The flight pattern can be included in the user interface 200 upon receiving a user selection of a layer 206 associated with the flight pattern (e.g., "Photosurvey area" as illustrated).

To determine the flight pattern, a user of the user interface 200 can specify a boundary of the location 202 to be inspected. For instance, the user can select corners of a polygon that encompasses the location 202, the user can sketch (e.g., using a finger or pen on a touch sensitive screen) the boundary, and so on. The flight planning system 300 can then determine a width that is to be utilized between legs of the flight pattern. As described above, the width can be based on a ground sampling distance (e.g., a user selected ground sampling distance) that identifies an acceptable number of image pixels per distance, and is therefore associated with a level of detail (e.g., detail required by the user). Utilizing the width, the flight planning system 300 determines a number of parallel legs to be flown by a UAV, such that the UAV can capture images of the entirety of the location 202.

As illustrated in FIG. 2E, the flight planning system 300 has determined that there are to be seven legs each separated by the determined width. In addition to the number of legs, the flight planning system 300 determines an order that each leg is to be navigated along, which as will be further described, can be based on a minimum turning radius of a UAV to be utilized. As will be described in FIG. 3, the flight planning system 300 can store configuration information, and other information indicative of capabilities, of various UAVs. The flight planning system 300 can present users with specific UAVs that will be available for use at a time of the inspection (e.g., the flight planning system 300 can store information describing upcoming flight plans). A user can select a particular UAV, and the flight planning system 300 can determine an order associated with each leg based on a turning radius associated with the selected UAV. For instance, a UAV can be unable to execute a turn after navigating along an initial leg, such that after executing the turn, the UAV is then able to navigate along an adjacent leg. Instead, the flight planning system 300 can determine that the UAV is to skip one or more adjacent legs, and navigate along a later leg. Once the later leg is navigated, the flight planning system 300 can determine that the UAV is to travel back up in the direction of the initial leg. An example of a flight pattern that skips adjacent legs is described below, and illustrated in FIG. 6B. Optionally, the flight planning system 300 can identify UAVs that can execute turns such that the UAVs can navigate along successive adjacent legs, and can present information to the user indicating the UAVs. Determining an order associated with each leg is described in more detail below, with respect to FIG. 5.

As described above, for a location 202 greater than a threshold size (e.g., greater than a threshold size along a same direction, such as greater than a ½ a mile, 1 mile, 3/2 mile, 5 miles, and so on), the flight planning system 300 can determine sub-areas to be inspected that are included in the location 202. For example, a polygonal shape, such as a rectangle, can be separated into multiple polygons (e.g., multiple rectangles). The flight planning system 300 can separate the location 202 into sub-areas, such that a UAV performing an inspection of the location 202 can navigate within the sub-areas, and not traverse the entirety of the threshold size in each leg.

Optionally, the flight planning system 300 can ensure that the launch/landing locations, flight pattern, and so on, are to be constrained within the geofence boundary 204. That is, the system can limit the extent to which the UAV executes a turn (e.g., limit the movement outside of an inspection area, for instance by immediately requiring that the UAV execute a turn after completing a leg), and thus navigates outside of the inspection area. The flight planning system 300 can present a warning when a launch/landing location is selected outside of the geofence, and can optionally block the location and/or recommend increasing the geofence. Similarly, for a particular geofence envelope (e.g., one based on a property boundary), the system 300 can determine that a particular UAV (e.g., model of UAV) does not have a minimum turning radius necessary to stay within the geofence. For instance, the UAV may not be able to turn sharply enough such that it can follow a flight pattern that stays within the geofence (e.g., upon completing a leg, the UAV may not be able to turn to a subsequent leg without exiting the geofence). The system 300 can access information indicating UAVs (e.g., available UAVs) and recommend a UAV that conforms to a minimum turning radius. Optionally the system 300 can block a UAV from receiving the flight plan, or the UAV can be set to not implement the flight plan. Optionally, the system 300 can recommend an increase to the geofence, or indicate that to stay within the geofence, the UAV will have to start turning prior to completing each leg (e.g., thus the sides may not be able to be imaged). Additionally, the system 300 may modify the flight pattern such that the UAV executes a turn prior to completing each leg, and then after completing each leg, the UAV navigates along the sides of the inspection area to capture images of the missed portions.

Figure 2F:
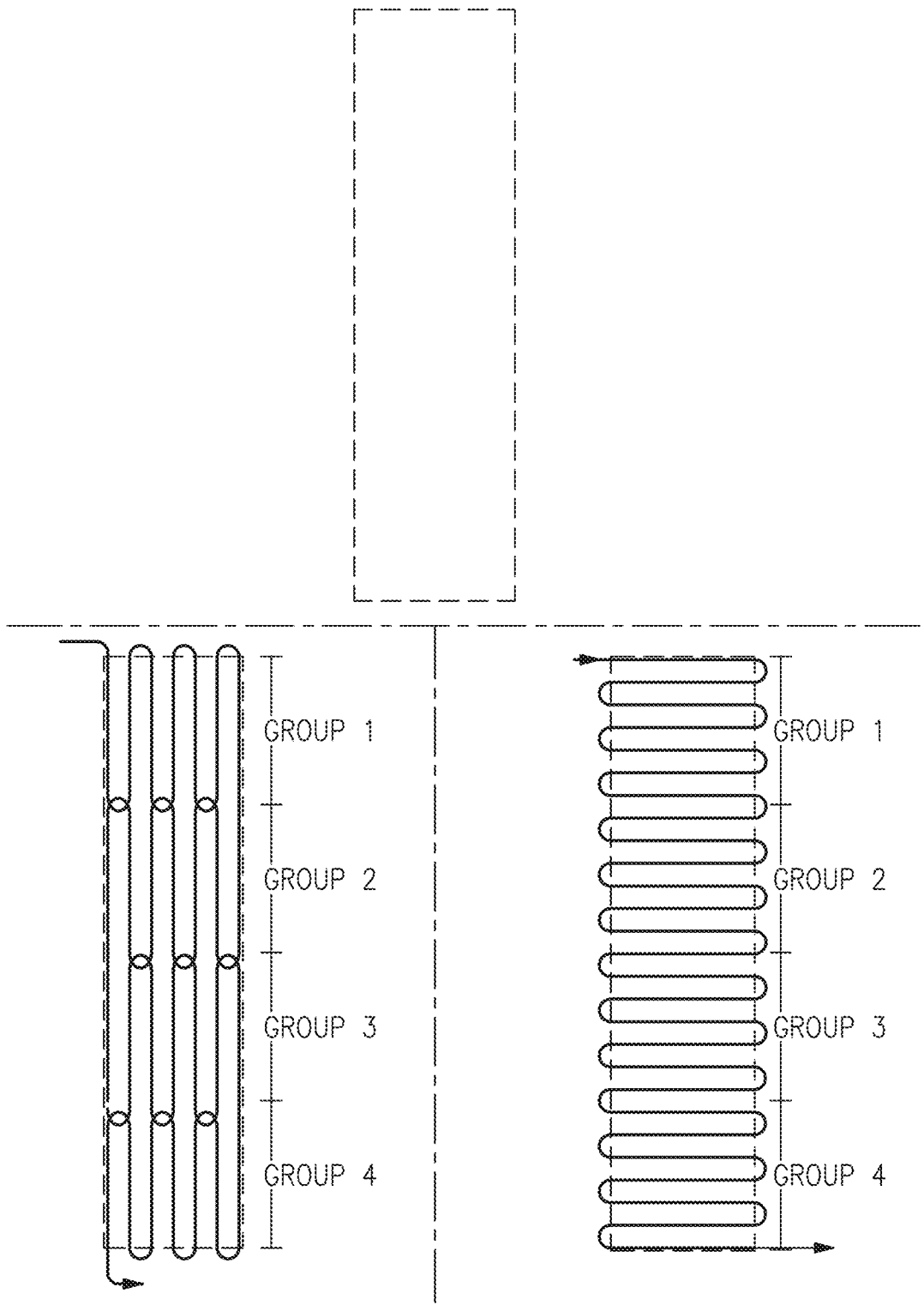
FIG. 2F illustrates an example of an area to be inspected, with a first dimension of the area being greater than a threshold distance.

FIG. 2F illustrates an example of an area 240 to be inspected, with a first dimension 242 of the area 240 being greater than a threshold distance. As described above, with reference to FIGS. 1A-1B, the flight planning system 300 can generate a flight pattern that includes adjacent legs, with the legs being along the longest dimension (e.g., the first dimension 242). Since the first dimension 242 in this example is greater than the threshold distance, a UAV navigating along each leg will spend a long amount of time navigating along each leg capturing images. If a camera utilized by the UAV malfunctions, or the images need to be otherwise retaken, the UAV can spend time navigating back to locations at which the camera malfunctioned. Additionally, as described above, the UAV can provide captured images to a user device of an operator (e.g., a ground control system) located proximate to the area 240. As the user device receives images, the user device can combine (e.g., stitch together) the images (e.g., using photogrammetry software). In this way, the user of the user device can monitor a progress of the flight plan, and obtain useful images while the UAV is in flight. However, for situations in which the UAV navigates along a same direction for greater than a threshold distance, to combine captured images, the user device would, in some implementations, require images be captured from adjacent legs. Therefore, the user can be required to wait longer while enough images are captured.

As illustrated in FIG. 2F, two example flight plans are included, with each flight including the area 240 separated into sub-areas, and groups of legs performed in each sub-area. Since the area 240 is separated into sub-areas, images captured in each sub-area can be processed (e.g., by the user device), enabling blocks, or other polygonal shapes, to be quickly processed. Similarly, other polygonal shapes, including a square with each dimension being greater a threshold size, can be separated into sub-areas.

Figure 3:
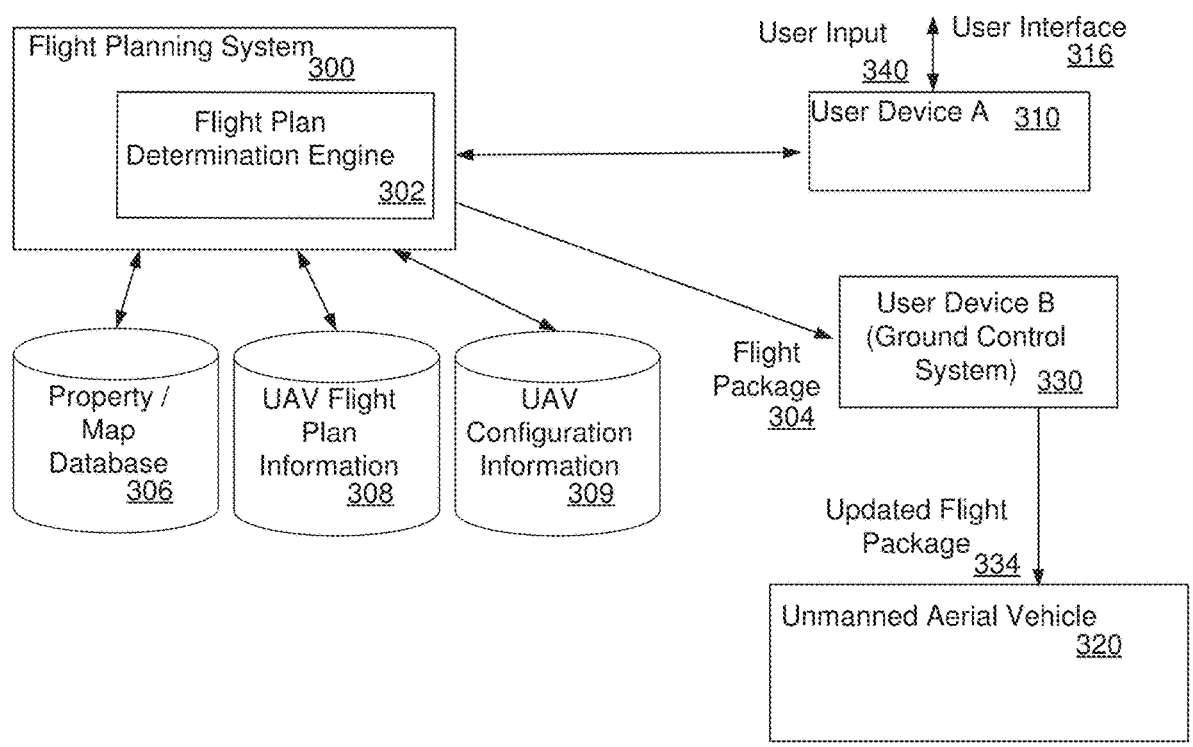
FIG. 3 illustrates a block diagram of an example flight planning system.

FIG. 3 illustrates a block diagram of an example flight planning system 300. The various illustrated components (e.g., systems and elements illustrated in FIG. 3) may communicate over wired and/or wireless communication channels (e.g., networks, peripheral buses, etc.). The flight planning system 300 can be a system of one or more computers, or software executing on a system of one or more computers, which is in communication with, or maintains, one or more databases (e.g., databases 306-309), and in communication with one or more user devices (e.g., user devices 310 and 330). The flight planning system 300 can be a system of one or more processors, graphics processors, logic circuits, analog circuits, associated volatile and/or non-volatile memory, associated input/output data ports, power ports, etc., and/or one or more software processing executing one or more processors or computers.

As described above, the flight planning system 300 can determine flight plans, including particular flight patterns for a UAV to follow, that are associated with performing inspections of areas. The flight planning system 300 includes a flight plan determination engine 302 that can generate one or more user interfaces 316 (e.g., as described in FIGS. 2A-2F) for presentation on a user device (e.g., User Device A 310), that enable a user of the user device to specify information associated with a flight plan. The flight planning system 300 can be in communication with User Device A 310 over a wired or wireless connection (e.g., the Internet, a Local Area Network, a Wide Area Network, and so on), and the user of the User Device A 310 can provide user input 340.

To describe one or more locations where the flight plan is to be conducted, a user interface 316 may be configured to receive, from the user of User Device A 310, location information associated with the flight plan (e.g., an address of a home or property, GNSS coordinates, and so on), and the flight plan determination engine 302 can obtain information describing the location. For instance, the information can include property boundaries associated with an address (e.g., boundaries of a home, obtained from a database such as the Property/Map database 306, or system, that stores or can access property boundary information), obstacles associated with the location (e.g., nearby trees, electrical towers, telephone poles) and/or other information. Additionally, the flight plan determination engine 302 can obtain images, such as geo-rectified images (e.g., satellite images), associated with the entered location information. The flight plan determination engine 302 can include some or all of the information describing the location (e.g., the obtained images or boundary information) in an interactive user interface 316 to be presented to the user of User Device A 310.

As described above, the flight plan determination engine 302 can obtain information generated from prior flight plans, including detailed images captured by a UAV performing a prior flight plan, a 3D model of an area that was inspected, textual information specifying obstacles noticed by an operator positioned proximate to an inspection area, and so on. The flight plan determination engine 302 can access a UAV Flight Plan Information database 308 that stores information generated from prior flight plans, and can present information in the user interface 316 specifying obstacles. For instance, the flight plan determination engine 302 can identify, such as by highlighting, a particular area of the obtained images presented to the user that includes an obstacle. Additionally, the flight plan determination engine 302 can present a warning if the user places a take-off location, or landing location (e.g., as described above), at a location that will interfere with an obstacle (e.g., a UAV navigating from the take-off location, or descending to the landing location, will be within a threshold distance of an obstacle, or a particular type of obstacle).

The user of User Device A 310 may interact with user interfaces 316 to describe a flight boundary geofence (as described above with respect to FIG. 2A) for a UAV to enforce. For instance, as described above, the flight plan determination engine 302 can provide images of a location, and a flight boundary geofence can be presented on the user interfaces over the images. The user interface 316 can provide functionality for the user to select a presented shape (e.g., a polygon), and further functionality enabling the user to drag and/or drop the shape to surround an area of interest in the received images that limits allowable locations of a UAV to locations within the shape. Optionally, the user interface 316 may allow a user of User Device 310 to trace (e.g., using a finger or stylus) a particular shape onto a touch-screen display of the user device 310, and the flight plan determination engine 302 can store information describing the trace as a flight boundary geofence. That is, User Device 310 can provide information describing the traced shape to the flight plan determination engine 302 (e.g., coordinates associated with the images), and the flight plan determination engine 302 can correlate the traced shape to location information in the real-world as illustrated by the images (e.g., GNSS coordinates, such as GPS coordinates, that correspond to the traced shape). Additionally, the geofence boundary can be described by one or more boundaries of a polygon, or one or more points located on an outside of the polygon, that are connected by lines, curves, and so on. The flight plan determination engine 302 can store the geofence boundary according to the points and curve information (e.g., Bezier curves).

Additionally, as described above in FIG. 2A, the flight plan determination engine 302 can determine a geofence boundary according to location that is to be inspected. For instance, the flight plan determination engine 302 can generate a buffer around the location as a geofence boundary, such that a UAV flying a resulting flight pattern can be located within the geofence when performing turns specified in the flight pattern. Since the turns can be dependent on a minimum turning radius of the UAV actually performing the flight pattern, the flight plan determination engine 302 can receive information identifying a particular UAV that will be utilized and/or information identifying a minimum turning radius of a UAV to be utilized. If a minimum turning radius of not known, an operator positioned proximate to the location to be inspected, can utilize a user device 330 (e.g., a ground control system) to specify a minimum turning radius of the UAV that is being utilized. Optionally, the flight plan determination engine 302 can utilize an average minimum turning radius, a worst-case minimum turning radius, and so on, as a constant when determining the buffer.

A user interface 316 can further enable the user to describe safe locations for a UAV to begin the flight plan (e.g., a take-off location) and end the flight plan (e.g., a landing location). As an example, the flight plan determination engine 302 can analyze the obtained images associated with the entered location information, and identify a geometric center of a convex area (e.g., a biggest convex area) within the geofence boundary that does not include obstructions (e.g., trees, cell phone towers, powerlines, buildings), such as an open pasture. Similarly, the flight plan determination engine 302 can obtain topological information associated with the entered location information, and can detect substantially flat areas (e.g., areas with less than a threshold of variance in height). For instance, the flight plan determination engine 302 can determine that an open clearing (e.g., an open clearing that is substantially flat) is a safe location for the UAV to take-off from, and can provide information recommending the open clearing in an interactive user interface 214 presented on the user device 212. Additionally, the flight plan determination engine 302 can analyze the obtained images and locate physical features that are known to generally be safe locations for take-off and landing. For example, the flight plan determination engine 302 can determine that a driveway of a home associated with the flight plan is safe, and can select the driveway as a safe take-off and landing location, or can recommend the driveway as a safe take-off and landing location.

The flight planning system 300 may store, and maintain, configuration information associated with a UAV, for example in a UAV Configuration Information database 309. Configuration information may include configuration information of each UAV, such as a particular type of UAV (e.g., multi-rotor, quadcopter, fixed-wing), information describing sensors or other payload modules, gimbal information (e.g., whether the UAV includes gimbals that can control sensors), software information, information indicative of characteristics of the UAV (e.g., wing information, motor information, and so on). The stored configuration information can be utilized by the flight plan determination engine 302 to determine a minimum turning radius of a UAV. For instance, the flight plan determination engine 302 can determine a minimum turning radius based on particular characteristics of the UAV, such as a maximum, or otherwise safe (e.g., as indicated by a manufacturer, a user, which can be based on weather information, and so on) bank angle based on wing characteristics, along with information describing motors and other power systems used by the UAV. For instance, the flight plan determination engine 302 can determine the minimum turning radius based on the maximum bank angle and a maximum speed that the UAV is to travel at (e.g., maximum safe speed, a speed constrained by a user, governmental entity, and so on). As described above, the minimum turning radius can be utilized when determining a geofence boundary, and a flight pattern for the UAV to follow.

The flight plan determination engine 302 can further determine, using configuration information, particular UAVs that can implement functionality associated with a flight plan. For instance, the inspection of the location can be associated with determining whether particular types of hail damage are evident, or whether storm damage is evident, radiation is being included at the location, and so on. The flight plan determination engine 302 can access configuration information of UAVs (e.g., UAVs available at a time associated with the flight plan), and can determine UAVs that include sensors, payload devices, and/or software such as computer vision algorithms, that can properly effect the inspection. For instance, the flight plan determination engine 302 can receive a time that the flight plan is to be performed (e.g., a particular day, a particular time at a particular day, a range of times, and so on). The flight plan determination engine 302 can then determine an availability of UAVs and/or operators at the received time(s) (e.g., the module 210 can obtain scheduling information). Additionally, the flight plan determination engine 302 can filter the available UAVs according to determined configuration information (e.g., as described above). Optionally, the flight plan determination engine 302 can access weather information associated with the received time(s), and determine an optimal time or range of times for the job to be performed. For instance, a UAV that includes particular sensors (e.g., electro-optic sensors) can obtain better real-world information at particular times of day (e.g., at noon on a sunny day can provide better images by maximizing image contrast and minimizing the effects of shadows). As a further example, in the example of hail damage, the flight plan determination engine 302 can identify a UAV with, for instance heat and/or thermal imaging sensors, specific visual classifiers that can discriminate hail damage from other types of damage, wind damage, rain damage, and so on. Similarly, as described above, flight plan determination engine 302 can determine one or more UAVs with minimum turning radii that can enable the UAV to navigate along successive legs of a flight pattern, instead of skipping legs as will be described below and illustrated in FIG. 6B.

Using the above described geofence boundary, landing/launch location, and optionally a particular UAV selected for the flight plan, the flight plan determination engine 302 can determine a flight pattern that enables a UAV to inspect the location. As described above, with reference to FIGS. 1A-1B, and 2E-2F, the flight plan determination engine 302 determines a number of parallel legs spaced apart by a particular width, that encompass the location to be inspected.

The particular width can be determined from a ground sampling distance that the user of User Device A 310 specifies. As described above, a ground sampling distance indicates, as one example, an acceptable number of pixels/distance that are to be included in images captured by a UAV, and is therefore associated with a required level of detail of the captured images. The ground sampling distance can further specify a maximum altitude that the UAV can ascend to and still capture images according to the ground sampling distance. For instance, the maximum altitude can be based on information associated with a camera to be utilized, such as a focal length of a lens, an aperture of a lens, a sensor size and resolution, and so on. In addition to the maximum altitude, the flight plan determination engine 302 can determine a safe minimum altitude, below which obstacles can be within a threshold distance of the UAV.

To determine the particular width, the flight plan determination engine 302 can ensure that a field of view of a camera will capture images from adjacent legs that encompasses the area between the legs. For instance, if the ground sampling distance indicates a particular altitude the UAV is to fly at to capture images while navigating along each leg, the flight plan determination engine 302 can determine that a width between each leg is set at a distance such that captured images, at the particular altitude, will include the entirety of the area between each leg. Optionally, and as will be described, the flight plan determination engine 302 can further reduce the width, such that legs are spaced closer together. The reduction in width can create an overlap area between each leg, such that images captured in adjacent legs will include a same overlap area between the legs. The overlap area can be useful to ensure that the entirety of the location is imaged, for instance if a UAV gets temporarily off course (e.g., due to wind, or a temporary autopilot malfunctioning, a contingency condition, and so on), a captured image could otherwise fail to include sufficient area. The overlap can act as a buffer against such situations.

The flight plan determination engine 302 further determines a number of legs, a directionality of each leg, and an order associated with each leg. As described above, the flight plan determination engine 302 can prefer that each leg be in a direction of a longest dimension of the location to be inspected (e.g., as illustrated in FIG. 1B). To determine a number of legs, the flight plan determination engine 302 can assign an initial leg as being at an end of the location to be inspected, and assign successive legs spaced at the determined width apart until the location is encompassed. Optionally, the flight plan determination engine 302 can determine a flight pattern from the take-off location to the initial leg, which can include the flight pattern causing the UAV to orient itself near the initial leg (e.g., execute a loiter turn). Additionally, as will be described, the flight plan determination system determines an order associated with each leg, which can be based on a minimum turning radius of a UAV and a width between each leg. For instance, if twice the minimum turning radius is less than the width between legs, the flight pattern can be a zig-zag, radiator, and so on, pattern that enables the UAV to navigate to immediately adjacent legs. In another instance, if twice the minimum turning radius is greater than or equal to the width, then the flight pattern can skip one or more adjacent legs when traveling to a next leg in the determined order.

The flight plan determination engine 302 can further determine information specifying times, or locations, at which a UAV is to capture images when navigating along the determined flight pattern. For instance, the UAV can capture images periodically (e.g., periodic in ground distance traveled) while navigating along each leg, and not capture images when executing turns. The flight plan determination engine 302 can determine the periodic distance As described above, the UAV can provide captured images (e.g., over a wireless connection, such as over 4G, LTE, Wi-Fi, BLUETOOTH, and so on) to a user device of an operator located proximate to the location being inspected (e.g., to a ground control system 330).

After determining the flight pattern, the flight plan determination engine 302 can generate a flight package 304 to be provided to a UAV 320, with the flight package 304 specifying information sufficient to implement the determined flight plan. Optionally, the flight package 304 can be formatted according to a particular UAV 320 (e.g., a particular type), or to particular flight control systems, and/or software versions, included in the UAV 320. Optionally, the flight package 304 can include a flight manifest file (e.g., an XML file) identifying necessary application and version information to conduct the flight plan. For instance, the UAV can be required to execute a particular application (e.g., "app" downloaded from an electronic application store) that provides functionality necessary to conduct the flight plan. As illustrated, User Device B (e.g., a ground control system), such as a tablet, laptop, wearable device, smart phone, or other user device that includes one or more processors, can receive the flight package 304 (e.g., over a wired or wireless connection). The ground control system 330 can be operated by an operator located proximate to a UAV performing the flight plan.

The ground control system 330 can present one or more user interfaces that describes the received flight package, such as user interfaces 2A-2F, and can enable an operator to modify one or more aspects of the flight plan. For instance, upon arriving at the location to be inspected, the operator can determine that a launch location is to be moved, or that a landing location is to be moved. Similarly, the operator can obtain weather information for the location, such as a wind speed and direction, and provide the weather information to the ground control system 330. The ground control system 330 can then modify one or more aspects of the flight plan, for example reducing a width between adjacent legs (e.g., the reduction will create more overlap as described above, which can act as a buffer to guard against the negative effects of wind). As another example, the ground control system 330 can determine whether, given a wind speed and direction, the UAV can navigate from the launch location safely to a particular altitude (e.g., avoiding obstacles), and further whether the UAV can easily follow the determined flight pattern to orient itself at an initial leg of the flight pattern. If the wind speed, given the wind direction, is too great, the ground control system 330 can relocate the launch location. Similarly, the ground control system 330 can modify a landing location based on wind speed and direction. As described above, optionally the ground control system 330 can ensure that the UAV is to be located within the geofence, and can optionally warn or block modifications to the flight plan if they cause the UAV to navigate outside.

Optionally, given a particular wind speed and direction (e.g., as measured by the operator, or as obtained from one or more sensors, or obtained from an outside system over a wireless network, such as a weather system), the ground control system 330 can determine that the flight pattern is infeasible. As described above, the flight pattern can be infeasible, when for instance, the wind can cause the UAV to travel faster than a frame rate of a camera will allow. That is, the UAV can travel too fast (e.g., a ground speed can be too great), such that a maximum frame rate of the camera will be unable to capture sufficient images of the location. Thus, given the wind speed, and a minimum speed of the UAV, the ground control system 330 can determine that the maximum frame rate will be unable to match the determined periodic locations at which the UAV is to capture an image. As an example of wind affecting frame rate, if the commanded airspeed is 15 m/s (e.g., velocity indicated in the flight plan), and a downwind component is 5 m/s, then the downwind ground speed is 20 m/s. For a maximum frame rate of 1 fps, this survey is only feasible if the requested photo interval is periodically set at 20 meters or more. The ground control system 330 can optionally determine that the legs of the flight pattern are to be rotated (e.g., rotated 90 degrees) if wind is affecting the UAV in an un-rotated direction, with additional legs added or subtracted to ensure that the entirety of the location is imaged. Since the UAV, when navigating along the rotated legs, will therefore not be in a same direction as the direction of the wind, the UAV can travel at a speed that enables it to capture images of the location.

The ground control system 330, or flight plan determination engine 302, can set a speed (e.g., a ground speed) at which the UAV is to travel at. For instance, a user can specify a speed, and/or the speed can be based on configuration information of UAVs (e.g., capabilities of the UAV). As described above, a speed of the UAV can affect whether a camera can capture images periodically according to distance traveled. Similarly, the speed can affect a shutter speed of a camera that is utilized, for instance if the UAV is traveling at a particular speed, and the shutter speed is set too low, the resulting images will be blurry. Since the shutter speed is affected by an aperture of a lens, an acceptable ISO level (e.g., a level at which noise will not cause the images to overly grainy or lack detail), and an amount of light (e.g., sun light), the flight plan determination engine 302 can determines time at which the UAV is to perform the flight plan, such that light will be ample. That is, the flight plan determination engine 302 can prefer times away from the morning or evenings, and can access weather information to determine if weather will be cloudy or rainy. In this way, the flight plan determination engine 302 can ensure that a shutter speed of a camera will greater than a threshold (e.g., $1/125$ second, $1/500$ second, $1/1000$ second, and so on).

Optionally, the ground sampling distance can be modified during a flight of the UAV 320. For instance, as the UAV 320 is navigating along a leg capturing images, a wind in a direction of the UAV's travel 320 can cause the UAV 320 to move too fast to capture images (e.g., based on a frame rate of the camera as described above). The ground control system 330 can receive information indicating that the UAV 320 is unable to capture sufficient images (e.g., periodic images according to ground distance traveled), and an operator of the ground control system 330 can modify the ground sampling distance. The UAV 320 can then ascend to an altitude associated with the modified (e.g., reduced) ground sampling distance, which can enable the UAV 320 to capture images at a slower frame rate (e.g., since more area is included in each image due the UAV 320 being located higher). Optionally, the UAV 320 can measure (e.g., using one or more sensors) wind information, and can determine a minimal adjustment (e.g., modified by a buffer) to the ground sampling distance that will enable the UAV 320 to capture sufficient images.

Additionally, a user of the flight planning system 300, or the operator utilizing the ground control system 330, can specify a range of acceptable ground sampling distances, and the UAV 320 can prefer the most detailed ground sampling distance. If the UAV 320 determines that it is unable to capture sufficient images due to a tail-wind affecting its speed, the UAV 320 can ascend to a higher altitude until it is able to capture sufficient images (e.g., images sufficient to include all of the location to be inspected).

The ground control system 330 can then provide the flight package 304, or an updated flight package 334 (e.g., modified as described above), to the UAV 320. As the UAV 320 navigates according to the flight plan indicated in the flight package 304, or updated flight package 334, the UAV can provide captured images to the ground control system 330 for presentation. Additionally, as the UAV 320 conducts a flight plan, the ground control system 330 can present a graphical representation of the progress of the UAV. For instance, the user device can present images (e.g., satellite images) of the survey area along with a representation of the flight pattern the UAV 1 is to follow. As an example, the representation of the flight pattern can include legs connected by turns, with an order that each leg is to be navigated to, included in the representation. The UAV 320 can provide geospatial location information to the ground control system 330, and the ground control system 330 can update a representation of the UAV 320 as it travels. Optionally, as the UAV 320 travels and captures sensor information (e.g., digital images), the ground control system 330 can include a bounding quadrilateral, or other shape, around a representation of the UAV 320, which represents a field of view being captured by the UAV 320 in sensor information (e.g., digital images), with for example, the field of view being an area of the property included in the sensor information (e.g., based on capabilities of the camera, such as focal length, sensor resolution and size, lens aperture, and so on). For instance, a displayed representation of the UAV 320 traveling may include a quadrilateral surrounding the representation. The quadrilateral tracks the movement of the UAV 320, and may change shapes as the UAV 320 shifts (e.g., roll, yaw, pitch axes). The shape shows the sensor field of view for the area of the ground the sensor would cover. The quadrilateral can be determined from a determined field of view of a sensor (e.g., camera) with respect to the UAV's 320 position (e.g., height, latitude and longitude) and attitude information. The field of view can be toggled on and off by the operator of the user device, and optionally each quadrilateral captured by the UAV's 320 camera can be highlighted, colored, shaded, and so on, to indicate that the portion of the property has been captured in sensor information (e.g., digital images). In this way, the operator can monitor the progress of the UAV 320, and ensure that the entirety of survey area is captured in images.

Although in one embodiment of the invention, the flight planning system 300 may be primarily used to create and transmit a flight package to a UAV or ground control system, the UAV or ground control system can initiate the request for a flight package from the flight planning system 200. An operator may take the UAV or ground control system to a property location (e.g., a location to be inspected). The UAV or ground control system may then request a flight package, or an updated flight package using its current position. For example, the UAV or ground control system can determine its geospatial position via a GNSS receiver (using GPS, GLONASS, Galileo, or Beidou system). The UAV or ground control system can then transmit its location information to the flight planning, along with other identifying information about the requesting device, such as its UID, or MAC address, etc. The flight planning system 300 can then receive the request, and determine if an updated or changed flight package exists by comparing the device identifier a database storing the new or updated flight package information. If a new or updated flight package exists, then the flight package can be transmitted from the flight planning system 300, and received by the UAV or ground control system. A confirmation acknowledging receipt of the flight package may then be transmitted from the UAV or ground control system to the flight planning system 300. The flight planning system 300 can then update a database specifying that the particular flight package has received. Moreover, the UAV or ground control system can supply the property location, and a new job request (e.g., new inspection) can be sent to the flight planning system. The flight planning system 300 may then create a new flight package for the UAV or ground control system.

Furthermore, as the UAV 320 navigates according to the flight plan, the UAV 320 can modify particulars of its movements based on wind affecting the UAV 320. For instance, the UAV 320 can bank against the wind, causing the UAV to rotate about one or more axes (e.g., a roll axis). In general, for UAVs that do not include gimbals that can control attitude information of a camera, the UAV 320 banking will cause the camera to also rotate about the one or more axes. A field of view of the camera can be modified in accordance with the rotation, such that the field of view will not be directly of the surface beneath the UAV 320. To counter the effects of the wind, the UAV 320 can temporarily return the UAV 320 to a righted position, capture an image, and then resume banking against the wind. In another instance, the UAV 320 can crab as it navigates, such that a nose of the UAV 320 is pointed partially into the direction of the wind. Similar to banking, the UAV 320 can temporarily orient itself with a nose pointed along the direction of the leg, capture an image, and resume crabbing. Additionally, the UAV 320 can modify a flight pattern (e.g., the ground control system 330 can receive the modification and an operator can approve or deny), or the ground control system 330 can modify the flight pattern based on determined wind conditions. For instance, the width between legs can be decreased depending on a speed and directionality of the wind, such that more legs are to be navigated along. Since the width can be decreased, an order that each leg is assigned can be further modified, as the minimum turning radius of the UAV 320 can be too high to allow for the UAV 320 to navigate to successive adjacent legs.

Figure 4:
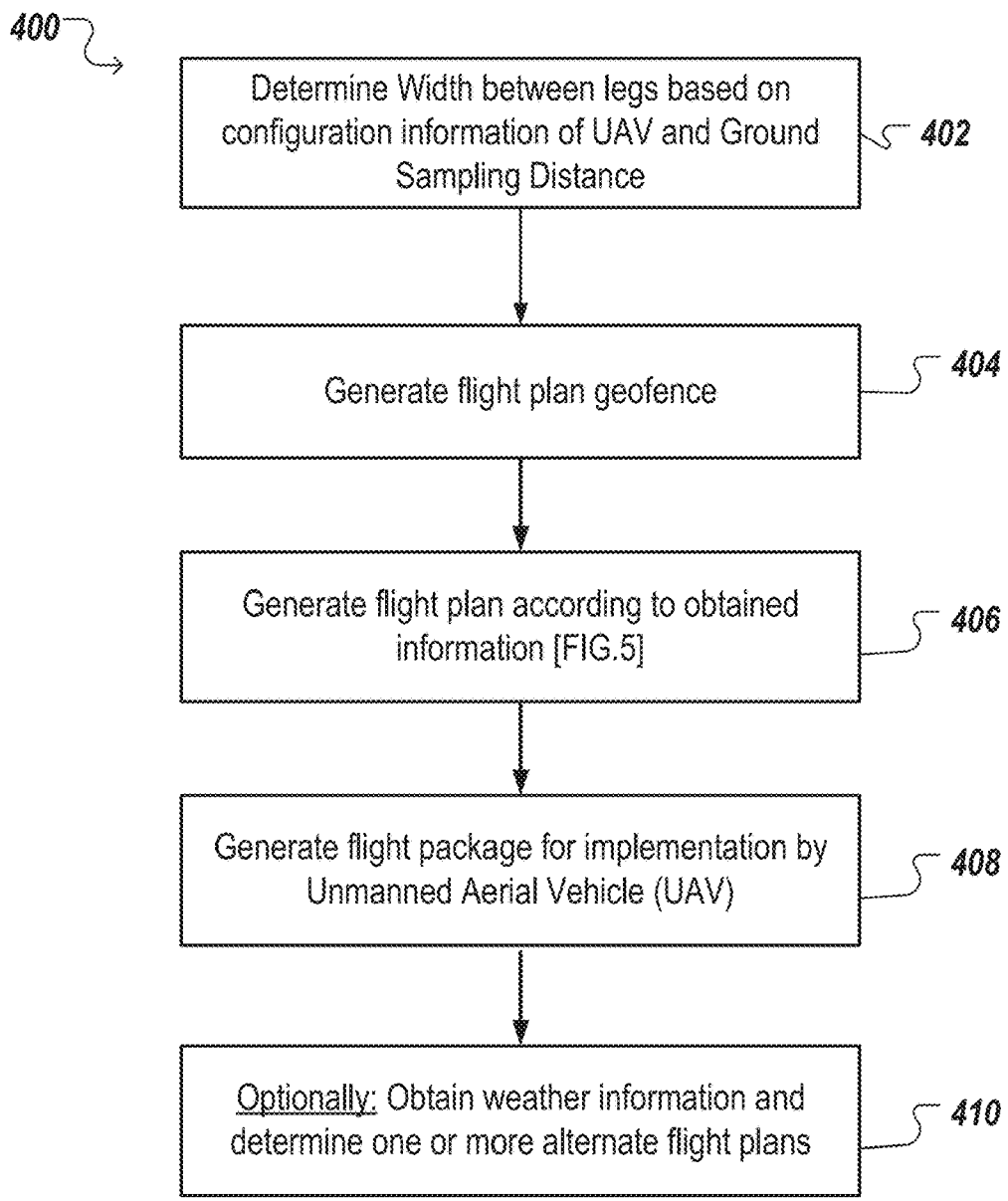
FIG. 4 illustrates an example process of generating a flight package to be provided to a UAV to perform an inspection of a location.

FIG. 4 illustrates an example process 400 of generating a flight package to be provided to an unmanned aerial vehicle (UAV) to perform an inspection of a location (e.g., also described as an area). For convenience, the process 400 will be described as being performed by a system of one or more computers (e.g., the flight planning system 300).

As described above, the system determines a flight package that indicates a flight plan associated with a UAV performing an inspection of a location (e.g., an agricultural area, a farm, a mining operation, a house tract, or any arbitrary area). As illustrated in FIGS. 1A-1B, the flight plan includes a flight pattern of parallel legs separated by a particular width (e.g., a zig-zag pattern, a radiator pattern, and so on).

The system determines a width to assign between adjacent legs (block 402). As described above, the system can obtain, or receive (e.g., from a user), information indicating a ground sampling distance that is acceptable for the flight plan. The system can determine a width based on the ground sampling distance, and configuration information of a UAV including a camera, such as a focal length of the camera, a resolution of a sensor, and so on. As described above, with respect to FIG. 3, the width can be a maximum distance that enables a UAV to capture images of the entirety of an area between each adjacent leg. Furthermore, the width can be shorter such that images captured while navigating adjacent legs will include an overlap area that is imaged. This overlap area can be utilized (e.g., by a photogrammetry system, or photogrammetry software) to combine the images (e.g., stitch together images).

The system determines a flight plan geofence (block 404). The geofence is determined based on (1) property information associated with a location to be inspected, and/or (2) a buffer surrounding the area to be inspected. For example, as illustrated in FIG. 2B, a buffer surrounding a location to be inspected can be designated as a geofence (e.g., based on a turning radius of a UAV, as described above). Optionally, the buffer can represent a minimum geofence, such that if a property boundary is less than the buffer zone, the flight plan can, in some implementations, not be performed as the UAV may travel across a property boundary into a neighboring property during the inspection. To determine the buffer, the system can obtain information describing the location to be inspected (e.g., from a property database, or a user can describe the boundaries of the location using one or more user interface as described above).

The system generates a flight pattern for a UAV to implement (block 406). As will be described in more detail, with respect to FIG. 5, the system utilizes the determined width and geofence to assign parallel legs to which the UAV is to navigate along, with an associated order and direction assigned to each leg.

The system generates a flight package for implementation by a UAV (block 408). As described above, with respect to FIG. 3, the system generates a flight package that is sufficient to enable the UAV to perform the inspection (e.g., in concert with an operator utilizing a ground control system).

The system optionally obtains weather information associated with the location, and determines one or more alternate flight plans (block 410). As described above, weather, for instance, wind, can affect an ability of a UAV to maintain a straight flight pattern, and additionally to execute a turn. To counteract the effects of wind, the system can optionally generate one or more alternative flight plans that can be utilized upon an operator arriving at the location and determining actual wind conditions.

For instance, a turn that causes the UAV to move from a due east direction, along a southerly direction during the turn, and ending at a west direction, can be negatively affected by strong wind in the southern direction. The UAV will be pushed further south than a flight plan may have anticipated, which can cause the UAV to have to skip a leg it would otherwise be able to navigate along absent wind. Therefore, the system can access weather information for the location, such as weather prediction information, and weather information experienced in prior flight plans to inspect the location. As an example, a particular location can be known to generally be windy along a same direction at a particular time of day. The system can generate an alternative flight plan, or optionally incorporate the weather information when first generating a flight plan, that can take the wind into account.

An alternate flight plan can have a modified width between legs (e.g., a reduction in width), such that the UAV may have to skip legs after executing turns (e.g., due to a minimum turning radius), and return to the skipped legs later in the flight plan. An example of skipping legs is described below, and illustrated in FIG. 6B. As described above, the reduction in width can account for the UAV having to bank against the wind or crab in a direction of the wind, which can affect a field of view of a camera of the UAV.

Similarly, one or more alternate flight plans can include the legs being rotated by a particular degree (e.g., 90 degrees), such that the wind will affect the UAV differently when navigating along each leg or when executing turns. For example, as described above, wind can cause the UAV to travel further when executing a turn, causing the UAV unable to navigate to a next ordered leg in the flight plan. An alternate flight plan can rotate the legs, such that the wind can cause the UAV to move faster when navigating along a direction of the rotated leg, but cause the UAV to no longer travel too far when executing a turn.

In addition to modifying flight plans by modifying particular flight patterns, the system can determine flight plans that include different launch and landing locations. For example, if wind is in a direction of the UAV launching, the UAV may be unable to follow a flight pattern to reach an initial leg. For instance, the UAV may be unable to climb high enough in a distance specified in the flight pattern, due to the wind propelling it forward. Therefore, the system can determine alternate launch and landing locations that are associated with different wind speeds and directionalities.

Figure 5:
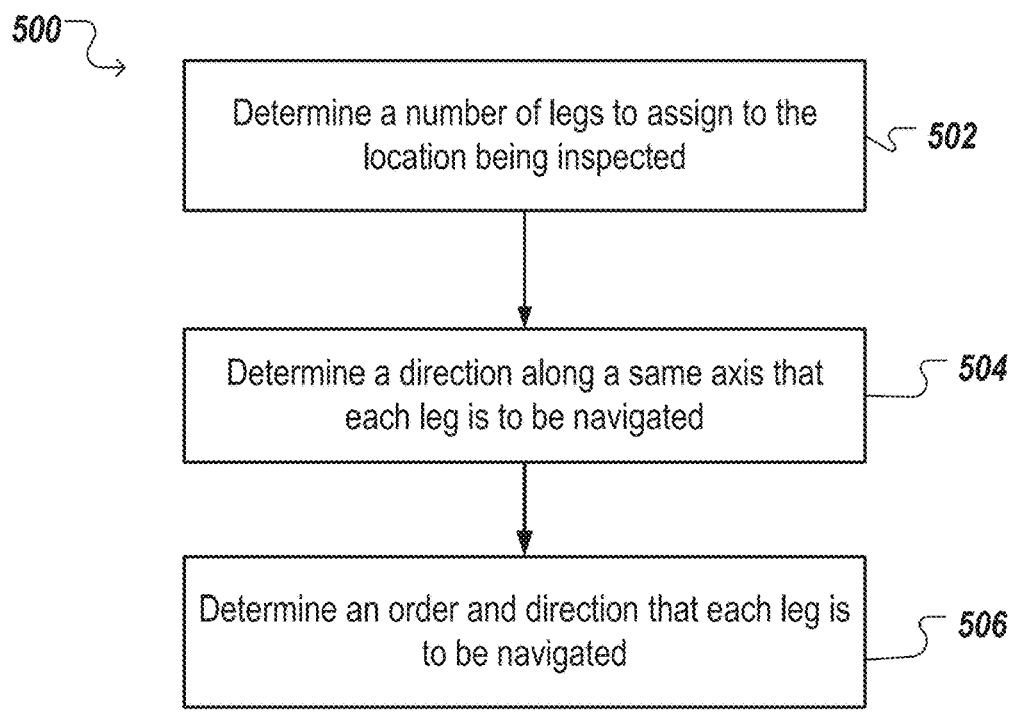
FIG. 5 illustrates an example process for determining a flight pattern associated with inspecting a location.

FIG. 5 illustrates an example process 500 for determining a flight pattern associated with inspecting a location. For convenience, the process 500 will be described as being performed by a system of one or more computers (e.g., the flight planning system 300).

The system determines a number of legs to assign to the location to be inspected (block 502). The system obtains information describing the location to be inspected, and based on the determined width between legs (e.g., described above with respect to FIG. 4), the system determines a number of legs, spaced apart according to the width, that will enable a UAV to obtain images of the entirety of the location. Optionally, the initial leg can be located at a boundary of the location, and legs can be assigned towards an opposite boundary of the location. In some implementations, the final leg may be located at the opposite boundary, or can be located a threshold distance from the boundary within the location, or located a threshold distance from the boundary outside the location. That is, depending on a shape of the location (e.g., particular polygonal shape), to capture images of the location, the last leg may be located within the location, on a boundary of the location, or outside the location (e.g., within the determined geofence).

The system determines a direction along a same axis that each leg is to be navigated (block 504). As described above, the system can orient legs to be along a longest dimension of the location. For instance, as illustrated in FIG. 1B, the legs assigned to the location 10 are oriented from a top of the page to a bottom of the page. In this way, the system can minimize (e.g., substantially, such as within a threshold) a number of turns that the UAV has to make, and can thus ensure that the UAV is spending more flight time capturing images.

The system determines an order and direction that each leg is to be navigated (block 506). Once the number of legs are determined and oriented, the system determines a flight pattern through the legs such that each leg is navigated along.

To initially reach a leg (e.g., an initial leg at a boundary of the location), the flight pattern can include a spiral ascent/descent being performed to a loiter circle that is aligned such that its exit bearing places the UAV on the initial leg of the survey. If the aircraft is not already on the circle at maneuver initiation, the behavior is similar to that of a flight circle maneuver: the circle will be intercepted at a point of tangency from the aircraft's starting location. Like a flight circle maneuver, the vehicle will climb or descend enroute towards the starting rally (e.g., an enroute spiral). This initial flight pattern to reach the initial leg is described above, and illustrated in FIG. 2D.

The order and direction that each leg (e.g., subsequent to the initial leg) is based on the minimum turning radius of the UAV. As described above, the minimum turning radius is bounded by the commanded airspeed of the maneuver. This allows for a minimum turn radius to be chosen based on the given desired airspeed and the maximum bank angle of the aircraft. Once the minimum turning radius is determined, the system determines whether the minimum turning radius is less than twice the determined width, and if so, the flight pattern can a radiator pattern, such that the UAV can navigate to adjacent legs.

Figure 6A:
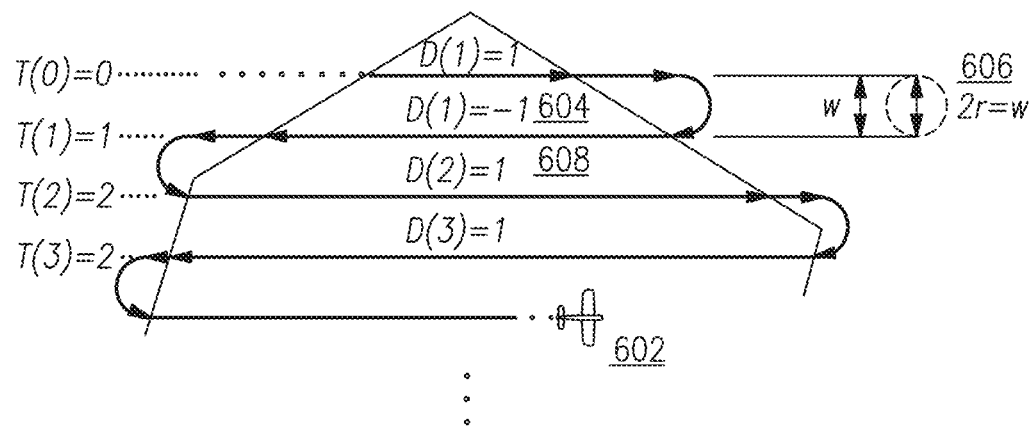
FIG. 6A illustrates an example of a radiator flight pattern.

FIG. 6A illustrates an example of a radiator flight pattern. As illustrated, a UAV 602 is navigating according to a flight pattern, in which each successive adjacent leg is navigated long after executing a turn 606. For instance, a first leg 604 is navigated along, a turn 606 is executed, and a second leg 608, subsequent to the first leg 604, is navigated along in an opposite direction.

Figure 6B:
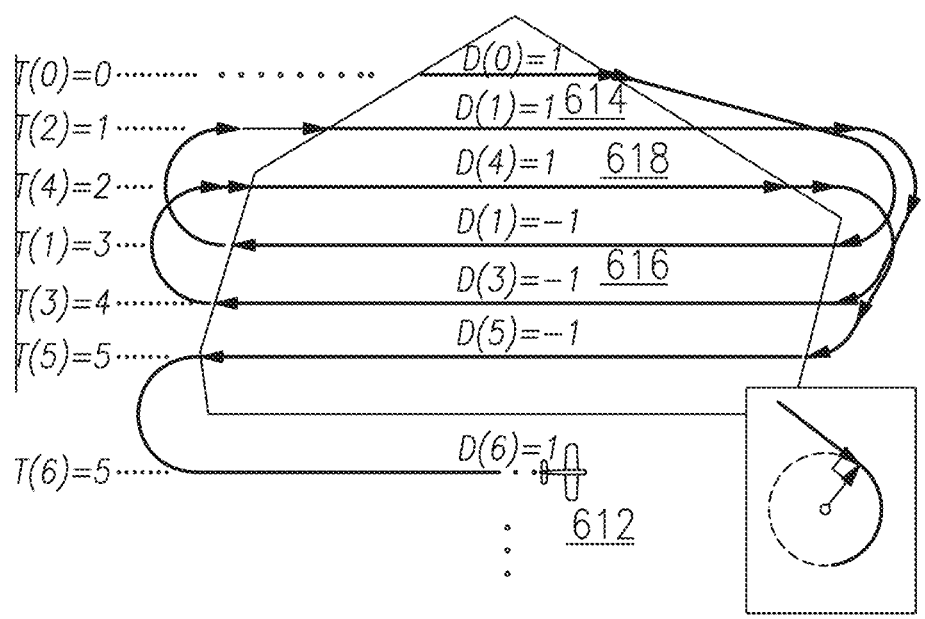
FIG. 6B illustrates a situation in which a minimum turn radius of a UAV is equal to the width between legs.

When the twice the minimum turning radius (r) is greater than or equal to the determined width (w), 2*r>=w, the system clusters groups of legs together, which is the more general case and described below with respect to FIG. 6B. As illustrated in FIG. 6B the turn radius may be too large to allow a 'radiator' pattern (e.g., as illustrated in FIG. 6A). In this more general case, legs are initially skipped and then returned to. FIG. 6B illustrates a situation in which the minimum turn radius is equal to the spacing (e.g., width) between survey (e.g., inspection) legs, and the UAV 612 skips two legs at a time, returning to fly the topmost un-skipped leg. For instance, as illustrated in FIG. 6B, the UAV 612 navigates along an initial leg 614, and upon completing the initial leg 614, executes a turn and skips two legs, and navigates in the opposite direction along leg 616. Once leg 616 is completed, the UAV 612 executes a turn and moves back up by skipping a leg, and navigates along leg 618. This skipping process repeats until all legs have been navigated along.

In general, a process to determine an order and direction associated with each leg can be described, as follows.

Figure 6C:
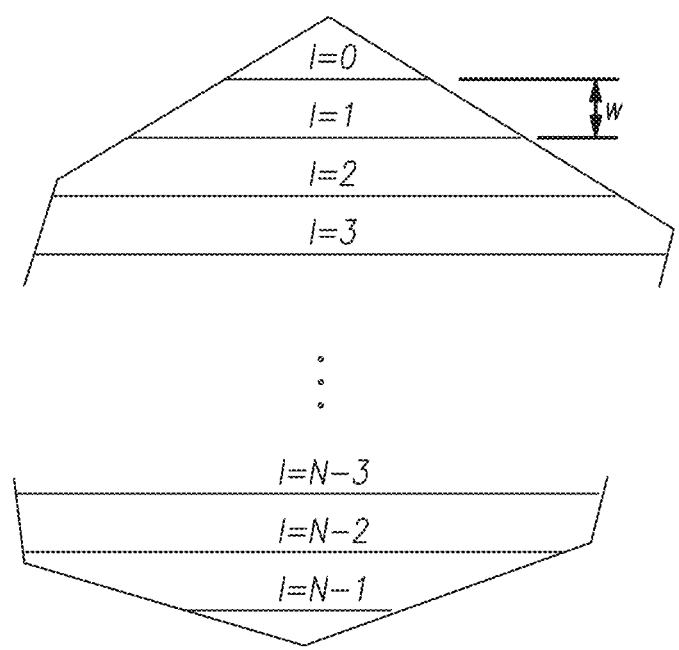
FIG. 6C illustrates a leg index associated with a number of legs.

As described above, a total number of legs 'N' can be determined. Referring to FIG. 6C, leg index $i \in \{0, 1, 2, \ldots, N-1\}$ (a.k.a. 'index'): The first leg corresponds to i=0, the next nearest leg corresponds to i=1, and so forth. Note that since the leg index in the example of FIG. 6C is zero-based, and the final leg in the survey is, in some examples, labeled i=N−1.

Leg pass number $k \in \{0, 1, 2, \ldots N-1\}$: This value indexes the flight order of the legs, with the first leg flown being k=0. For each subsequent leg, this value can be increased by one, thus tracking a quantity of legs that have been navigated.

Minimum vehicle turn radius R>0: This is the minimum turning radius, as described above.

Minimum maneuver turn radius r≥R: The photo survey guidance method may not command the vehicle to make turns that are smaller than this radius. Note that this value is maneuver specific and distinct from the vehicle minimum turn radius R; photo surveys must have r≥R.

Traversal index $T(k) \in i\{0, 1, 2, \ldots N-1\}$, that is T(k)=i. The traversal index indicates which order of a leg (e.g., k) is associated with each leg index (e.g., i). The first leg to be traversed is T(0)=0 (i.e. the topmost leg); T(k) for m>0 depends on r and w, as prescribed by the method given below.

Figure 6D:
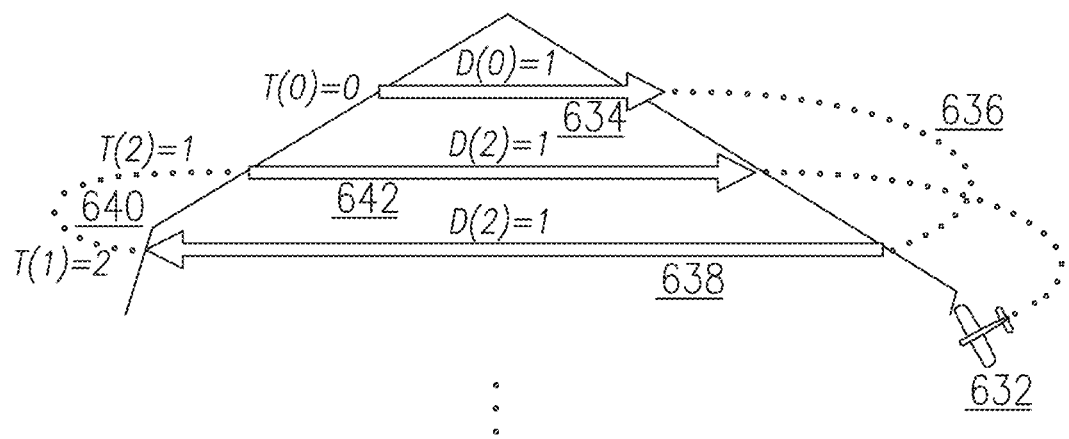
FIG. 6D illustrates traversal directions associated with legs.

Referring to FIG. 6D, Traversal direction $D(k) \in \{-1, 1\}$ (aka 'direction'): D(k)=1 can be defined, in some implementations, to be an index k that is traversed in the same direction as the first (e.g., initial) leg. Thus D(0)=1, since 0 corresponds to the initial leg in the order. Legs flown in the opposite direction can have a direction of −1. In some implementations, the process can guarantee that D(k+1)=−D(k), such that the direction reverses with each traversal.

Leg exit direction $X(k) \in \{-1, 0, 1\}$: X(k)=1 can also be defined, in some implementations, to mean that leg k will be exited via a right turn, and X(k)=−1 to mean it will be exited via a left turn. X(k)=0 indicates that a leg will be exited without a turn; this may happens on a final leg of the survey.

Leg entry direction $E(k) \in \{-1, 1\}$: E(k)=1 can be defined to mean, in some implementations, that leg k will be entered via a right turn, and E(k)=−1 to mean it will be entered via a left turn. Note that by convention E(0)=1; that is, the topmost leg is entered via a right hand turn (part of the starting rally); this keeps the starting rally circle within the survey area.

Figure 6E:
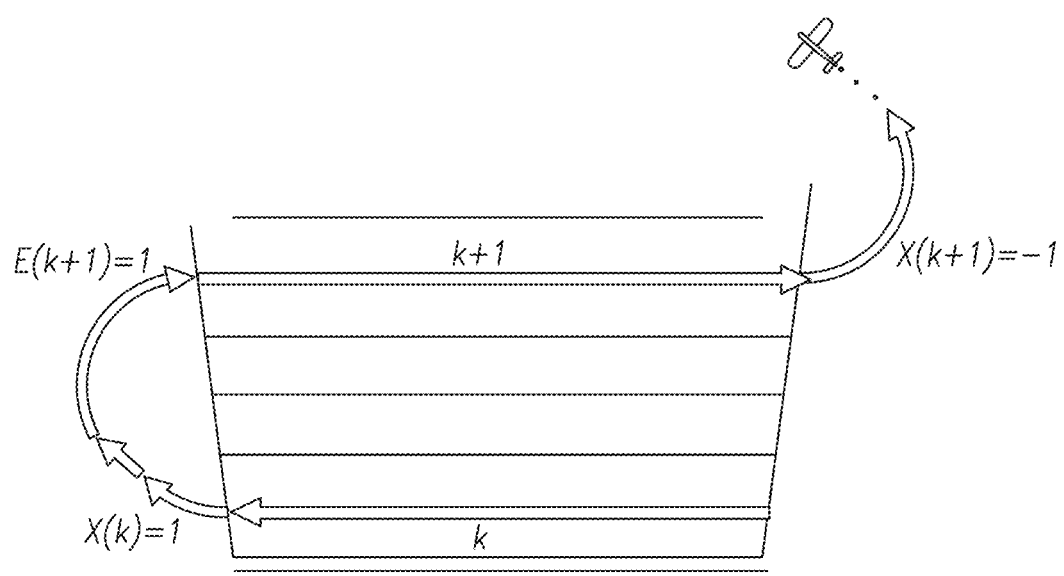
FIGS. 6E-6F illustrate two examples transitions between example legs.
Figure 6F:
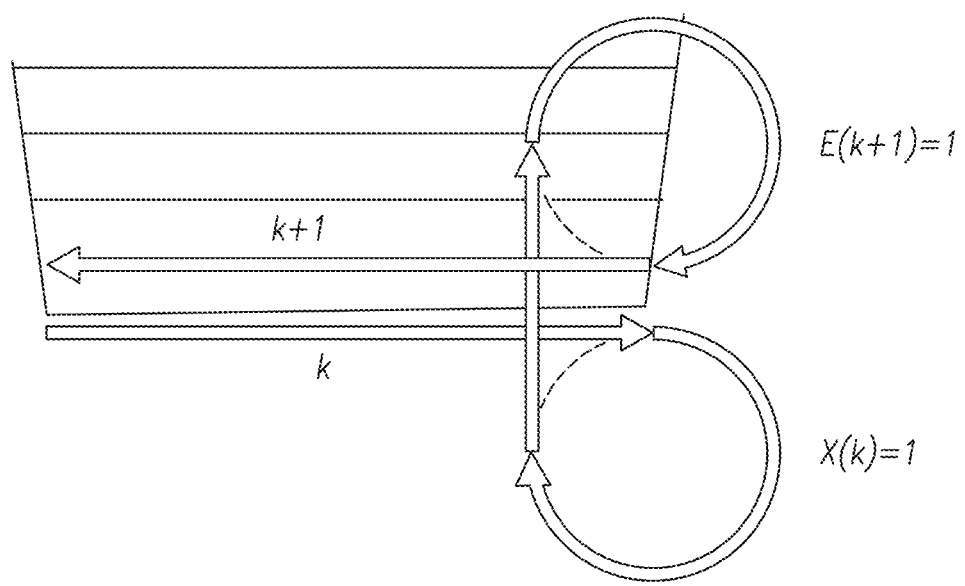
Figure 6G:
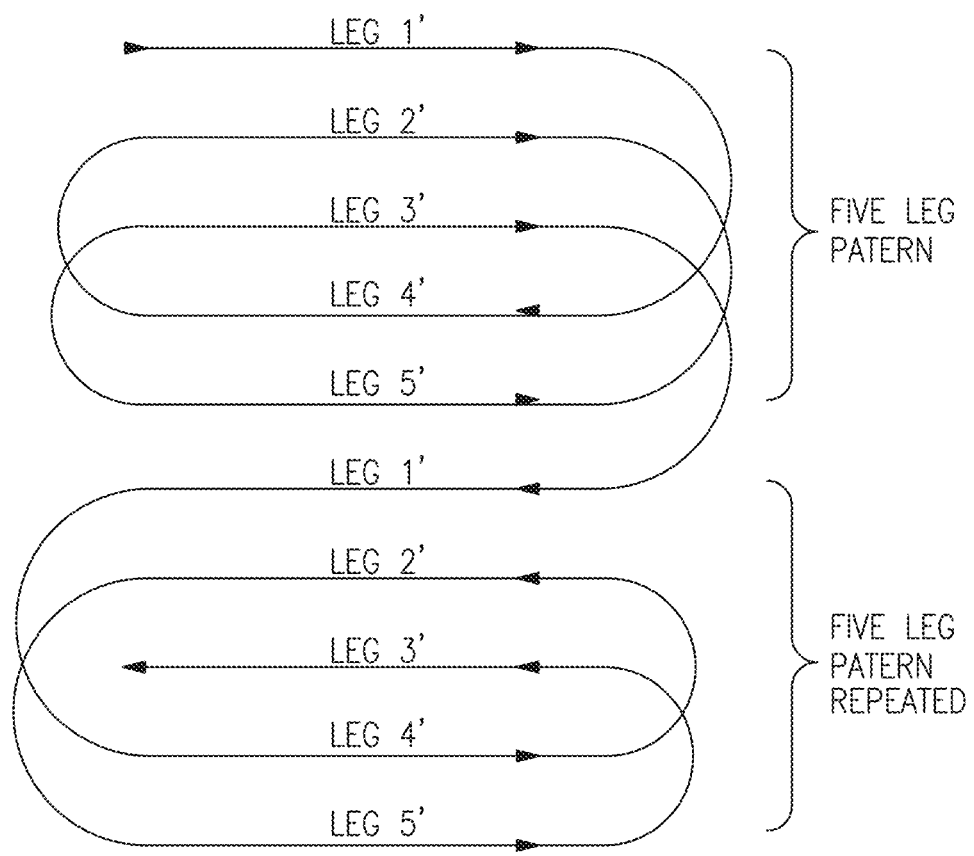
FIG. 6G illustrates an example inspection area.

Referring to FIGS. 6E-6F, the figures illustrate E(k) and X(k) for two example transitions between legs k and k+1. Note that the values of E(k) and X(k) govern the 'footprint' of the maneuver when transitioning between legs and can be used to generate a more accurate buffer zone.

Optionally, E(k)=X(k−1); for a particular transition from one leg to the next, the aircraft may execute turns in one direction.

Leg Traversal Order. Given that r (e.g., minimum maneuver turn radius, such as user set value, as described above), w (e.g., width between legs), N (e.g., number of legs), are fixed throughout the flight pattern, the value for any k, of T(k), D(k), X(k−1) and E(k), given the values of T(k−1) and D(k−1), can be determined.

The system can compute T(k), D(k), X(k−1) and E(k), and also values for $k \in \{0, 1, 2, \ldots N-1\}$ (e.g., the whole survey). Optionally, D(k) may alternate between 1 and −1.

Optionally, to determine an order associated with each leg, the system determines whether $k_{current} \geq i_{current}+1$, and if so, the subsequent leg to be navigated along is a first number of legs subsequent to the instant leg (e.g., i, as described above, represents a label associated with each leg, and $i_{current}$ represents the instant leg), where the first number of legs is equal to ceiling $$\left(2*\frac{r}{w}\right)+1.$$

That is, for k+1, if the above determination is true, then $$i_{subsequent} = i_{current} + \text{ceiling}\left(2*\frac{r}{w}\right)+1.$$

If the opposite, k<i_current+1 is true, then the subsequent leg to be navigated along is a second number of legs prior to the instant leg, where the second number of legs is equal to ceiling $$\left(2*\frac{r}{w}\right).$$

That is, for k+1, if the above determination is true, then $$i_{subsequent} = i_{current} - \text{ceiling}\left(2*\frac{r}{w}\right).$$

In the above described optional determination of order, when ceiling $$\left(2*\frac{r}{w}\right)=2,$$

the UAV would navigate along a first leg, and skip 3 legs down, then move two legs back up, and repeat. Note that the UAV would, after navigating along 5 legs (e.g., k>5), repeat the same navigation, except the directionality would be reversed with respect to the prior navigation of 5 legs. An example of this periodicity is graphically illustrated with respect to FIG. 6G, and described below. The periodicity depends on the value of ceiling $$\left(2*\frac{r}{w}\right),$$

for instance if ceiling $$\left(2*\frac{r}{w}\right)=3,$$

the periodicity would be 7, and so on. In general, the periodicity can be represented as being equal to 2*ceiling $$\left(2*\frac{r}{w}\right)+1.$$

As described above, the UAV may determine this order while online through monitoring of the above-described variables.

In some implementations, and as an example, the system can determine a number of legs to skip along a same direction after completing a particular leg. That is, the system can determine that a subsequent leg to be inspected, in a determined order, is (y=floor(2*r/w)+1) legs further than a present leg being inspected, with floor(2*r/w) equaling the minimum number of legs that have to be skipped based on the turning radius. For instance, as illustrated in example FIG. 6B, in some implementations, r can equal w (e.g., in some implementations r>=w), such that y would be determined as being 2. Therefore, after completing an inspection of a particular leg, the UAV would have to navigate to a minimum of a second leg after the particular leg (e.g., the UAV skips at least one leg). However, as the UAV navigates from a top leg (e.g., as illustrated in FIG. 6B), the system can determine that the UAV should skip 2 legs when navigating towards the end of the area to a subsequent leg, and then skip 1 leg when navigating towards the top of the area to inspect a skipped leg. That is, since the UAV has to skip at least one leg, the flight pattern causes the UAV to skip two legs when navigating downwards, and skip one leg when navigating upwards.

In some implementations, groups (e.g., clusters) of adjacent legs can be determined, with each group being associated with the UAV navigating along a same direction. For instance, as illustrated in FIG. 6B, the first three adjacent legs are navigated in a same direction (e.g., direction '1'), while the next three adjacent legs are navigated in an opposite direction (e.g., direction '−1'). To determine a number of adjacent legs that are to be grouped according to direction, the system can utilize the y=floor(2*r/w)+1 formula described above. For instance, in FIG. 6B, this formula can, as described above, be equivalent to 2. This value of 2 can represent a number of legs to be grouped together, in addition to the base case in which each group includes a single leg (e.g., as in FIG. 6A, subsequent legs switch order). Therefore, the value of 2 can be added to the base case of a single leg, and as illustrated, 3 adjacent legs can be grouped together. Therefore, the system can determine the flight pattern to start at the initial leg in a first grouping (e.g., a grouping with direction '1'), and move to an initial leg in a second grouping with direction '−1' (e.g., by skipping two legs in a downward direction after the initial leg). After, the flight pattern can move to a subsequent leg in the first grouping (e.g., the UAV can move upwards by skipping one leg), and then a subsequent leg in the second groping (e.g., the UAV can skip two legs in a downward direction), and so on.

Turn Radius Less Than, To ½ Transect (2*r<w). Referring to FIG. 6A, in this case, 2*r/w<1, so ceiling(2*r/w)=1, and so the traversal order will be identical to the transect numbering and the vehicle will describe a 'radiator' style ground track. In this case T(k)=m and D(k)=(−1)^m, i.e. T(0)=0, D(0)=1, T(1)=1.

Turn Radius greater than or equal to ½ Transect (2*r>=w). Referring to FIG. 6B, in this case the 2nd leg to be traversed will be the fourth leg from the top of the survey (T(1)=3, 'skipping' 2 transects), from right to left (D(1)=−1), and the aircraft's 3rd traversed leg will be the second from the top (T(2)=1, covering the first 'skipped' transect), from left to right (D(3)=1). The 4th traversed leg is then the 5th leg from the top of the survey, followed by the 5th traversed leg being the 3rd from the top (covering the 2nd and last 'skipped' leg). At this point the pattern will recur, except flipped: The 6th leg to be traversed will be the sixth from the top (T(5)=5) and will be from right to left (D(4)=−1).

As described above, an order can be assigned to each leg, along with a direction. In general, the description above has described a location to be inspected as rectangular, however the shape of the location can affect the order and direction of each leg. For example, returning to FIG. 6D, the UAV 632 is illustrated navigating from a third ordered leg 642 (e.g., T(2) in the parlance described above). The UAV 632 began at an initial leg 634, executed a turn 636, and skipped the third leg 642, to navigate along a second leg 638. The UAV 632 was unable to execute a turn sharp enough after the initial leg 634 to navigate along the adjacent leg 642, and therefore had skipped the adjacent leg 642 to navigate along leg 638. However, as illustrated, after navigating along leg 638, the UAV executes a turn 640, and navigates along the adjacent leg 642 instead of skipping a leg. The shape of the location enables this. That is, when navigating down the page, the shape is expanding along the dimension of the legs. However, when the UAV 632 executes a turn to move upward, the shape shrinks in the dimension, which provides for greater room for the UAV 632 to complete the turn. Therefore, when the UAV 632 executes turn 640, the UAV 632 has more space to complete the turn, enabling the UAV 632 to reach the adjacent leg 642.

FIG. 6F illustrates examples transitions between example legs. In FIG. 6F, a UAV has navigated along a last leg (e.g., a final leg, such as an extremity, border, of the area to be inspected, as labeled by 'i' described above), and is navigating to a final leg to be inspected according to a determined order (e.g., a final leg pass number). That is, as illustrated the UAV has navigating along a leg ordered as being the $k^{th}$ leg to be navigated, and therefore is going to navigate along a subsequent leg according to the order (e.g., k=k+1). Since the UAV, as illustrated, cannot navigate according to a radiator flight pattern, and therefore cannot navigate from leg k to k=k+1 by making a simple turn (e.g., the minimum turning radius will not allow the UAV to execute the turn), the UAV has executed a maneuver to navigate along leg k=k+1. For instance, the UAV can execute a first turn (e.g., turn 652, according to the UAV's minimum turning radius) to navigate up the area to be inspected (e.g., orthogonal to a direction of each leg), and then execute a second turn (e.g., turn 654) to navigate along k=k+1. In this way, the UAV can navigate according to an order that it determines (e.g. as described above), or the system determines, and ensure that it navigates along each leg.

Referring to FIG. 6G, the UAV or ground control station may receive a flight plan for a survey pattern to be conducted by a fixed-wing UAV. The flight plan may include five or more legs to be flown by the UAV to perform an inspection for a large survey area. The legs of the survey pattern are horizontally disposed from one another. The flight plan can include one or more multiple five-leg patterns, and can cause the UAV to fly to a position at a first altitude. The UAV can then proceed to a first leg (Leg 1') of the flight pattern, and fly in a first direction along the first leg. Instead of banking to an adjacent leg, for example leg two (Leg 2'), which may require a steep banking angle, or a dog-bone pattern, the UAV can bank at a shallower angle proceeding to a fourth leg (Leg 4'), thereby skipping legs two and three. The UAV can navigate in a second direction opposite the first direction along the fourth leg. At the end of the fourth leg, the UAV can bank back towards the second leg (Leg 2'), thereby skipping leg three (Leg 3'). The UAV can navigate along the second leg in a similar direction of the first leg. At the end of the second leg, the UAV can bank towards a fifth leg (Leg 5'), and fly along the fifth leg in a similar direction as the fourth leg. At the end of the fifth leg, the UAV can bank towards the third leg, and navigate along the third leg in a direction similar to the fifth leg. At the end of the third leg (Leg 3'), the UAV may continue with another five leg pattern, and navigate to Leg 1" of the next pattern which is similar to the first five leg pattern, but the flight direction of the corresponding legs are flown in the opposite direction. For example, Leg 1' and Leg 1" are flown in opposite directions, and Leg 3' and Leg 3" are flown in opposite directions. For a very large survey area this five-leg pattern may be repeated multiple times. This flight pattern provides an efficient way to cover a large area, and reduce the bank angle flown by a fixed-wing plane thereby reducing the risk of potential stalling of the plane. The five-leg pattern as discussed above may be connected to other flight patterns. Also, ideally if a rectangular area is being inspected, the pattern would be flown with the legs of the pattern running the longer length of the rectangular area.

The spacing of the legs can be a function of the coverage area, field of view of an onboard sensor, such as a fixed camera. The second leg is disposed between the first and the third legs, the third leg is disposed between the second and the fourth legs, and the fourth leg is disposed between the third and the fifth leg.

The description above, for instance with respect to FIGS. 5-6G, described a system determining a flight pattern, including an order assigned to each leg. Optionally, the UAV receive information indicating values of particular parameters, including one or more of the minimum turning radius and the width between legs, and the UAV can determine an order assigned to each leg (e.g., while in flight). That is, the UAV can determine a next leg to navigate along based on an identifier of the current leg and the current leg pass number (e.g., as described above, the UAV can determine whether $k_{current} \geq i_{current}+1$ is true). Utilizing information identifying a current direction of the UAV, an identifier of the current leg, and the current leg pass number, the UAV can determine a particular leg to next navigate along, including a directionality of the navigation (e.g., opposite to a current direction).

Figure 7:
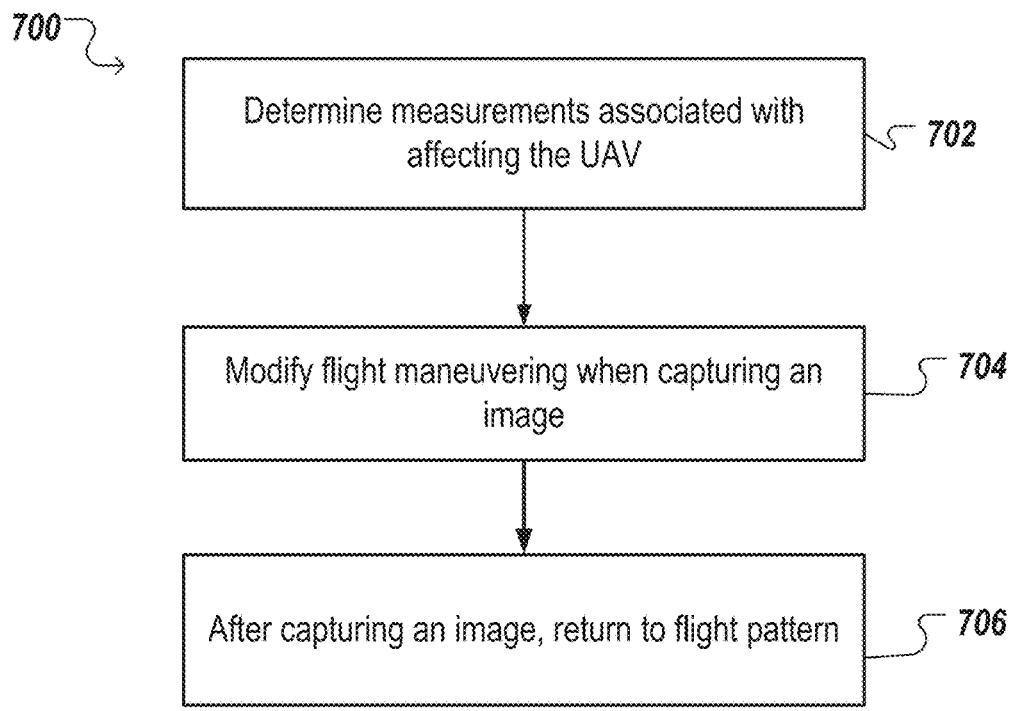
FIG. 7 is a flowchart of an example process for a UAV modifying a flight plan according to wind affecting the UAV.

FIG. 7 is a flowchart of an example process 700 for a UAV modifying a flight plan according to wind affecting the UAV. For convenience, the process 700 will be described as being performed by a UAV of one or more processors (e.g., a UAV implementing the example UAV architecture described in FIG. 8).

The UAV determines measurements associated with wind affecting the UAV while navigating according to a flight plan (block 702). As described above, as the UAV navigates along one or more legs, wind can cause the UAV to be unable to capture images with a field of view directly down to the surface. For instance, the UAV may have to bank against a direction of the wind, which can cause a camera of the UAV to be oriented at an angle away from vertically down. Similarly, the UAV may have to crab, with its nose partially, or fully, in a direction of the wind, which can modify an orientation of the camera. As an example of determining wind, the UAV can a difference between predicted motion of the UAV and real motion as measured by one or more sensors (e.g., using one or more of attitude information from an inertial measurement unit, altitude information, GNSS coordinates, optionally in conjunction with one or more aerodynamic models).

The UAV modifies its flight maneuvering when capturing an image (block 704). As described above, the UAV captures images periodically while navigating along legs. To counter the effects of wind, the UAV can temporarily adjust its flight characteristics when capturing an image, such that resulting images are not skewed or rotated as described above.

For instance, a threshold distance, or time, prior to capturing an image, the UAV can prepare for capturing the image. That is, the UAV can determine that if the UAV modifies its flight characteristics, at a time, or location, of image capture, the UAV will be oriented properly (e.g., nose along a direction of the leg, not banking). As described above, the UAV can temporarily increase a particular aspect of a stability controller, such as a derivative term, to provide quick adjustments to wind affecting the UAV, which can increase the UAV's ability to remain stable during image capture. Since an increase in the derivative term may result in the stability controller becoming unstable (e.g., due to a buildup of the effects of the modification), after taking the image the UAV can modify the stability controller (e.g., back to a normal level).

Furthermore, the UAV can monitor measurements associated with wind, and determine a range of values associated with the measurements. For instance, the UAV can determine that the wind speed varies from a particular value, to another particular value. As the UAV is approaching a location, or time, at which to capture an image, the UAV can capture the image (e.g., and modify flight maneuvers) when the measurements associated with the wind are within a threshold level of the lowest average levels measured. Optionally, the flight plan being implemented can include successive images that include overlap between each image. In this way, the UAV can have a range of locations, or times, at which to capture an image, and can select a location, or time, within the range, such that a successive image can be captured and no area of the location will be missed in images. Optionally, if no lull in the wind is determined, the UAV can capture an image within the range.

After capturing an image, the UAV returns to the flight pattern and resumes countering the wind (block 706). After the image is captured, the UAV modifies its flight maneuvering to return to banking, crabbing, and so on, along the leg.

Figure 8:
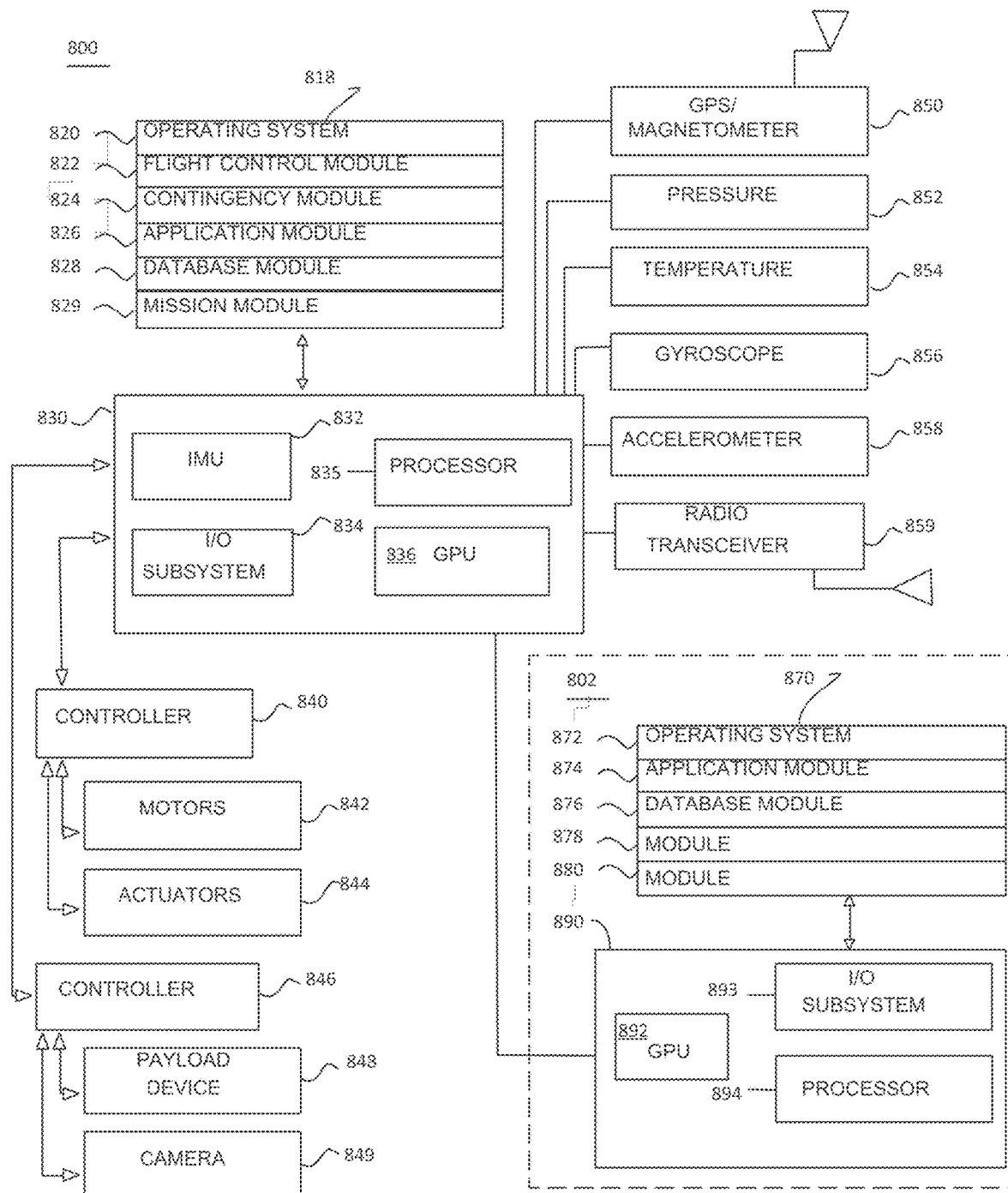
FIG. 8 illustrates a block diagram of an example Unmanned Aerial Vehicle (UAV) architecture.

FIG. 8 illustrates a block diagram of an example Unmanned Aerial Vehicle (UAV) architecture for implementing the features and processes described herein. A UAV primary processing system 800 can be a system of one or more computers, or software executing on a system of one or more computers, which is in communication with, or maintains, one or more databases. The UAV primary processing system 800 can be a system of one or more processors 835, graphics processors 836, I/O subsystem 834, logic circuits, analog circuits, associated volatile and/or non-volatile memory, associated input/output data ports, power ports, etc., and/or one or more software processing executing one or more processors or computers. Memory 818 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 850, gyroscopes 856, accelerometers 858, pressure sensors (static or differential) 852, current sensors, voltage sensors, magnetometer, hydrometer, and motor sensors. The UAV may use an inertial measurement unit (IMU) 832 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 800 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module 822 handles flight control operations of the UAV. The module interacts with one or more controllers 840 that control operation of motors 842 and/or actuators 844. For example, the motors may be used for rotation of propellers, and the actuators may be used for flight surface control such as ailerons, rudders, flaps, landing gear, and parachute deployment.

The contingency module 824 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 829 processes the flight plan, waypoints, and other associated information with the flight plan as provided to the UAV in the flight package. The mission module 829 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 849, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 818 of the UAV processing system 800.

The UAV processing system 800 may be coupled to various radios, and transmitters 859 for manual control of the UAV, and for wireless or wired data transmission to and from the UAV primary processing system 800, and optionally the UAV secondary processing system 802. The UAV may use one or more communications subsystems, such as a wireless communication or wired subsystem, to facilitate communication to and from the UAV. Wireless communication subsystems may include radio transceivers, and infrared, optical ultrasonic, electromagnetic devices. Wired communication systems may include ports such as Ethernet, USB ports, serial ports, or other types of port to establish a wired connection to the UAV with other devices, such as a ground control system, flight planning system, or other devices, for example a mobile phone, tablet, personal computer, display monitor, other other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

Modules, programs or instructions for performing flight operations, contingency maneuvers, and other functions may be performed with the operating system. In some implementations, the operating system 120 can be a real time operating system (RTOS), UNIX, LINUX, OS X, WINDOWS, ANDROID or other operating system. Additionally, other software modules and applications may run on the operating system, such as a flight control module 822, contingency module 824, application module 826, and database module 828. Typically flight critical functions will be performed using the UAV processing system 800. Operating system 820 may include instructions for handling basic system services and for performing hardware dependent tasks.

In addition to the UAV primary processing system 800, a secondary processing system 802 may be used to run another operating system to perform other functions. A UAV secondary processing system 802 can be a system of one or more computers, or software executing on a system of one or more computers, which is in communication with, or maintains, one or more databases. The UAV secondary processing system 802 can be a system of one or more processors 894, graphics processors 892, I/O subsystem 894 logic circuits, analog circuits, associated volatile and/or non-volatile memory, associated input/output data ports, power ports, etc., and/or one or more software processing executing one or more processors or computers. Memory 870 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 802 will be non-critical functions in nature, that is if the function fails, the UAV will still be able to safely operate. In some implementations, the operating system 872 can be based on real time operating system (RTOS), UNIX, LINUX, OS X, WINDOWS, ANDROID or other operating system. Additionally, other software modules and applications may run on the operating system 872, such as an application module 874, database module 876. Operating system 802 may include instructions for handling basic system services and for performing hardware dependent tasks.

Also, controllers 846 may be used to interact and operate a payload device 848, and other devices such as photographic camera 849, video camera, infra-red camera, multispectral camera, stereo camera pair, Lidar, radio transceiver, sonar, laser ranger, altimeter, TCAS (traffic collision avoidance system), ADS-B (Automatic dependent surveillance—broadcast) transponder. Optionally, the secondary processing system 802 may have coupled controllers to control payload devices.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module, or block is necessary or indispensable. The novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A flight planning system for selecting an unmanned aerial vehicle (UAV) to navigate according to a flight pattern, the flight planning system comprising:
   a data store storing configuration information associated with multiple UAVs available for an aerial inspection of an area to be inspected;
   a processor; and
   a non-transitory storage medium storing instructions which, when executed by the processor, cause the processor to:
      determine a geofence boundary for the area, wherein flight operations in the area are limited to locations within the geofence boundary;
      determine a flight pattern within the area according to the geofence boundary, the flight pattern including a plurality of inspection legs being substantially parallel to one another in which adjacent inspection legs throughout the flight pattern are separated by a particular width, wherein at least a first set of two adjacent inspection legs are to be traversed in the same direction, wherein each inspection leg is associated with a performance of an aerial inspection of the area along the inspection leg;

determine a navigation order for each inspection leg, wherein the navigation order skips inspection legs and then returns to inspection legs that are skipped when navigating according to the flight pattern, wherein the navigation order is determined, while the UAV is in flight, based, at least in part, on information identifying a minimum turning radius of the UAV and the particular width;

determine, from amongst the multiple UAVs, a UAV configured to perform the aerial inspection of the area according to the flight pattern based on the configuration information within the data store; and direct the UAV to autonomously navigate along each inspection leg according to the determined flight pattern.

2. The flight planning system of claim 1, wherein the navigation order skips a first number of inspection legs along the same direction and skips a second number of inspections legs along an opposite direction with the second number of inspections legs being different than the first number of inspection legs.

3. The flight planning system of claim 1, wherein the UAV is configured to obtain sensor data of the area while the UAV navigates along each inspection leg according to the flight pattern.

4. The flight planning system of claim 1, wherein the navigation order is further determined based, at least in part, on wind affecting an ability of the UAV to maintain a straight flight pattern.

5. The flight planning system of claim 1, wherein the navigation order is further determined based, at least in part, on weather information associated with the locations.

6. The flight planning system of claim 1, wherein the instructions to direct the UAV to autonomously navigate along each inspection leg according to the flight pattern, when executed by the processor, cause the processor to:
direct the UAV to navigate along a first inspection leg in a first direction to an end of the first inspection leg;
direct the UAV to navigate to a third inspection leg, the third inspection leg being non-adjacent to the first inspection leg;
direct the UAV to navigate in a second direction opposite the first direction along the third inspection leg and to an end of the third inspection leg;
direct the UAV to navigate to a second inspection leg; and
direct the UAV to navigate along the second inspection leg and to an end of the second inspection leg in the same direction as the first direction.

7. The flight planning system of claim 1, wherein flight pattern comprises:
a first inspection leg for navigation by the UAV to be flown in a first direction along the first inspection leg;
a curved segment at the end of the first inspection leg connecting the first inspection leg to a fourth inspection leg, the fourth leg to be flown in a second direction opposite the first direction;
a curved segment at the end of the fourth inspection leg connecting the fourth inspection leg to a second inspection leg, the second inspection leg to be flown in the first direction;
a curved segment at the end of the second inspection leg connecting the second inspection leg to a fifth inspection leg, the fifth inspection leg to be flown in the second direction; and
a curved segment at the end of the fifth inspection leg connecting the fifth inspection leg to a third inspection leg, the third inspection leg to be flown in the first direction.

8. The flight planning system of claim 1, wherein the flight pattern further comprises at least a second set of two adjacent inspection legs that are to be traversed in an opposite direction than the first set.

9. The flight planning system of claim 1, wherein the flight pattern includes the UAV performing from a take-off location a flight to an enroute spiral to orient the UAV along a direction of an initial leg of the flight pattern.

10. The flight planning system of claim 1, wherein the instructions, when executed by the processor, cause the processor to:
determine the particular width between inspection legs based on the configuration information of the UAV and a ground sampling distance for images to be obtained by the UAV.

11. A non-transitory computer storage medium storing instructions operable to cause one or more processors to perform operations comprising:
determining a geofence boundary for an area to be inspected, wherein flight operations in the area are limited to locations within the geofence boundary;
determining a flight pattern according to the geofence boundary, the flight pattern including a plurality of inspection legs being substantially parallel to one another in which adjacent inspection legs throughout the flight pattern are separated by a particular width, wherein at least a first set of two adjacent inspection legs are to be traversed in the same direction, wherein each inspection leg is associated with a performance of an aerial inspection of the area along the inspection leg;
determine a navigation order for each inspection leg, wherein the navigation order skips inspection legs and then returns to inspection legs that are skipped when navigating according to the flight pattern, wherein the navigation order is determined, while the UAV is in flight, based, at least in part, on information identifying a minimum turning radius of the UAV and the particular width;
determining, from amongst multiple UAVs for which configuration information is available, a UAV configured to perform the aerial inspection of the area according to the flight pattern based on the configuration information; and
outputting the flight pattern for use by the UAV.

12. The non-transitory computer storage medium of claim 11, wherein the navigation order skips a first number of inspection legs along the same direction and skips a second number of inspections legs along an opposite direction with the second number of inspections legs being different than the first number of inspection legs.

13. The non-transitory computer storage medium of claim 11, wherein the UAV is configured to obtain sensor data of the area while the UAV navigates along each inspection leg according to the flight pattern.

14. The non-transitory computer storage medium of claim 11, wherein the navigation order is further determined based, at least in part, on wind affecting an ability of the UAV to maintain a straight flight pattern.

15. The non-transitory computer storage medium of claim 11, wherein the navigation order is further determined based, at least in part, on weather information associated with the locations.

16. The non-transitory computer storage medium of claim 11, wherein the flight pattern configures the UAV to:
navigate along a first inspection leg in a first direction to an end of the first inspection leg;
navigate to a third inspection leg, the third inspection leg being non-adjacent to the first inspection leg;
navigate in a second direction opposite the first direction along the third inspection leg and to an end of the third inspection leg;
navigate to a second inspection leg; and
navigate along the second inspection leg and to an end of the second inspection leg in the same direction as the first direction.

17. The non-transitory computer storage medium of claim 11, wherein the flight pattern comprises:
a first inspection leg for navigation by the UAV to be flown in a first direction along the first inspection leg;
a curved segment at the end of the first inspection leg connecting the first inspection leg to a fourth inspection leg, the fourth leg to be flown in a second direction opposite the first direction;
a curved segment at the end of the fourth inspection leg connecting the fourth inspection leg to a second inspection leg, the second inspection leg to be flown in the first direction;
a curved segment at the end of the second inspection leg connecting the second inspection leg to a fifth inspection leg, the fifth inspection leg to be flown in the second direction; and
a curved segment at the end of the fifth inspection leg connecting the fifth inspection leg to a third inspection leg, the third inspection leg to be flown in the first direction.

18. The non-transitory computer storage medium of claim 11, wherein the flight pattern further comprises at least a second set of two adjacent inspection legs that are to be traversed in an opposite direction than the first set.

19. The non-transitory computer storage medium of claim 11, wherein the flight pattern includes the UAV performing from a take-off location a flight to an enroute spiral to orient the UAV along a direction of an initial leg of the flight pattern.

20. The non-transitory computer storage medium of claim 11, the operations further comprising:
determining the particular width between inspection legs based on the configuration information of the UAV, and a ground sampling distance for images to be obtained by the UAV.

21. A computerized method, the method comprising:
determining a flight pattern for an aerial inspection of an area, the flight pattern including a plurality of inspection legs being substantially parallel to one another in which adjacent inspection legs throughout the flight pattern are separated by a particular width, wherein at least a first set of two adjacent inspection legs are to be traversed in the same direction, wherein each inspection leg is associated with a performance of an aerial inspection of the area along the inspection leg;
determining a navigation order for each inspection leg, wherein the navigation order skips inspection legs and then returns to inspection legs that are skipped when navigating according to the flight pattern, wherein the navigation order is determined, while the UAV is in flight, based, at least in part, on information identifying a minimum turning radius of the UAV and the particular width;
determining, based on capabilities of multiple UAVs available for the aerial inspection of the area, a UAV configured to perform the aerial inspection of the area according to the flight pattern; and
directing the UAV to autonomously navigate along each inspection leg according to the determined flight pattern.

22. The method of claim 21, wherein the navigation order skips a first number of inspection legs along the same direction and skips a second number of inspections legs along an opposite direction with the second number of inspections legs being different than the first number of inspection legs.

23. The method of claim 21, wherein the UAV is configured to obtain sensor data of the area while the UAV navigates along each inspection leg according to the flight pattern.

24. The method of claim 21, wherein the navigation order is further determined based, at least in part, on wind affecting an ability of the UAV to maintain a straight flight pattern.

25. The method of claim 21, wherein the navigation order is further determined based, at least in part, on weather information associated with the locations.

26. The method of claim 21, wherein directing the UAV to autonomously navigate along each inspection leg according to the flight pattern comprises:
directing the UAV to navigate along a first inspection leg in a first direction to an end of the first inspection leg;
directing the UAV to navigate to a third inspection leg, the third inspection leg being non-adjacent to the first inspection leg;
directing the UAV to navigate in a second direction opposite the first direction along the third inspection leg and to an end of the third inspection leg;
directing the UAV to navigate to a second inspection leg; and
directing the UAV to navigate along the second inspection leg and to an end of the second inspection leg in the same direction as the first direction.

27. The method of claim 21, wherein the flight pattern comprises:
a first inspection leg for navigation by the UAV to be flown in a first direction along the first inspection leg;
a curved segment at the end of the first inspection leg connecting the first inspection leg to a fourth inspection leg, the fourth leg to be flown in a second direction opposite the first direction;
a curved segment at the end of the fourth inspection leg connecting the fourth inspection leg to a second inspection leg, the second inspection leg to be flown in the first direction;
a curved segment at the end of the second inspection leg connecting the second inspection leg to a fifth inspection leg, the fifth inspection leg to be flown in the second direction; and
a curved segment at the end of the fifth inspection leg connecting the fifth inspection leg to a third inspection leg, the third inspection leg to be flown in the first direction.

28. The method of claim 21, wherein the flight pattern includes at least a second set of two adjacent inspection legs that are to be traversed in an opposite direction than the first set.

29. The method of claim 21, wherein the flight pattern includes the UAV performing from a take-off location a flight to an enroute spiral to orient the UAV along a direction of an initial leg of the flight pattern.

30. The method of claim 21, the further comprising:
- determining the particular width between inspection legs based on the capabilities of the UAV, and a ground sampling distance for images to be obtained by the UAV.

* * * * *